(12) United States Patent
Ishikura

(10) Patent No.: US 12,168,324 B2
(45) Date of Patent: Dec. 17, 2024

(54) THREE-DIMENSIONAL SHAPING DEVICE AND METHOD FOR MANUFACTURING THREE-DIMENSIONAL SHAPED OBJECT PRELIMINARY

(71) Applicant: SEIKO EPSON CORPORATION, Tokyo (JP)

(72) Inventor: Keigo Ishikura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/058,531

(22) Filed: Nov. 23, 2022

(65) Prior Publication Data
US 2023/0158747 A1     May 25, 2023

(30) Foreign Application Priority Data
Nov. 25, 2021    (JP) ................................. 2021-191206

(51) Int. Cl.
*B29C 64/35*        (2017.01)
*B29C 64/118*      (2017.01)
(Continued)

(52) U.S. Cl.
CPC ............ *B29C 64/35* (2017.08); *B29C 64/393* (2017.08); *B33Y 10/00* (2014.12); *B33Y 30/00* (2014.12);
(Continued)

(58) Field of Classification Search
CPC ..... B29C 64/35; B29C 64/393; B29C 64/118; B29C 64/182; B29C 64/209; B29C 64/20;
(Continued)

(56) References Cited

U.S. PATENT DOCUMENTS

| 10,702,039 B2 | 7/2020 | Shimizu |
| 2007/0085876 A1 | 4/2007 | Harper et al. |

(Continued)

FOREIGN PATENT DOCUMENTS

| CN | 101678383 A | 3/2010 |
| CN | 204974541 U | 1/2016 |

(Continued)

*Primary Examiner* — Seyed Masoud Malekzadeh
*Assistant Examiner* — Xinwen Ye
(74) *Attorney, Agent, or Firm* — WORKMAN NYDEGGER

(57) ABSTRACT

A three-dimensional shaping device includes an ejection unit configured to eject a shaping material from a nozzle; a stage; a drive unit configured to change a relative position between the ejection unit and the stage; a cleaning mechanism provided with a brush and a blade; and a control unit. The control unit executes a cleaning operation of bringing at least one of the brush and the blade into contact with the nozzle by causing the nozzle to reciprocate in a manner in which the nozzle crosses the cleaning mechanism for a plurality of times in a cleaning processing. The control unit causes the nozzle to reciprocate such that the nozzle comes into contact with the brush or the blade at different positions in the cleaning operation. The control unit records at least one of material information on a type of the plasticizing material, a cumulative ejection amount of the shaping material ejected from the nozzle, and a use time of the nozzle in association with the nozzle.

13 Claims, 15 Drawing Sheets

(51) Int. Cl.
  *B29C 64/393* (2017.01)
  *B33Y 10/00* (2015.01)
  *B33Y 30/00* (2015.01)
  *B33Y 40/00* (2020.01)
  *B33Y 50/02* (2015.01)
(52) U.S. Cl.
  CPC ............... *B33Y 40/00* (2014.12); *B33Y 50/02* (2014.12); *B29C 64/118* (2017.08)
(58) Field of Classification Search
  CPC ....... B29C 64/106; B33Y 10/00; B33Y 30/00; B33Y 40/00; B33Y 50/02
  See application file for complete search history.

(56) References Cited

U.S. PATENT DOCUMENTS

| | | |
|---|---|---|
| 2007/0134035 A1 | 6/2007 | Kageyama |
| 2008/0317894 A1 | 12/2008 | Turley et al. |
| 2009/0035405 A1 | 2/2009 | Leavitt |
| 2012/0007932 A1* | 1/2012 | Yokoyama ............. B41J 3/4071 347/110 |
| 2013/0241102 A1 | 9/2013 | Rodgers et al. |
| 2014/0125734 A1 | 5/2014 | Kobayashi |
| 2015/0158254 A1* | 6/2015 | Chang ....................... B08B 1/30 15/104.001 |
| 2015/0165694 A1 | 6/2015 | Lee et al. |
| 2016/0176120 A1* | 6/2016 | Skubic .................. B29C 64/118 29/428 |
| 2018/0001556 A1 | 1/2018 | Buller et al. |
| 2018/0117834 A1 | 5/2018 | Murao |
| 2019/0134907 A1 | 5/2019 | Hoechsmann et al. |
| 2020/0406548 A1 | 12/2020 | Yuwaki et al. |
| 2021/0178752 A1* | 6/2021 | Johnson ................. B41J 2/0451 |
| 2022/0134667 A1 | 5/2022 | Mansell et al. |
| 2022/0203617 A1 | 6/2022 | Pekic |

FOREIGN PATENT DOCUMENTS

| | | | |
|---|---|---|---|
| CN | 111319367 A | 6/2020 | |
| JP | 2003-502184 A | 1/2003 | |
| JP | 2006-192710 A | 7/2006 | |
| JP | 2010-530326 A | 9/2010 | |
| JP | 2010-535117 A | 11/2010 | |
| JP | 2015-112873 A | 6/2015 | |
| JP | 2018-075825 A | 5/2018 | |
| JP | 2020-069726 A | 5/2020 | |
| TW | 200932547 A | 8/2009 | |
| WO | 00/78519 | 12/2000 | |
| WO | 2010/001897 A | 1/2010 | |
| WO | WO-2010001897 A1 * | 1/2010 | ......... B01D 46/0001 |
| WO | 2020/198881 A | 10/2020 | |

* cited by examiner

| NOZZLE IDENTIFICATION INFORMATION |
| --- |
| MATERIAL INFORMATION |
| CUMULATIVE EJECTION AMOUNT |
| NOZZLE USE TIME |
| CLEANING PROCESSING EXECUTION HISTORY |

FIG. 9
| MATERIAL A | | | | | TB1 |
|---|---|---|---|---|---|
| CUMULATIVE EJECTION AMOUNT | 1000g | 5000g | 10000g | 50000g | |
| NUMBER OF BRUSHING TIMES | 1 | 2 | 4 | 8 | |
| DISCHARGE AMOUNT | 1g | 2g | 3g | 4g | |
| MATERIAL B | | | | | |
| CUMULATIVE EJECTION AMOUNT | 800g | 4000g | 8000g | 40000g | |
| NUMBER OF BRUSHING TIMES | 1 | 3 | 5 | 10 | |
| DISCHARGE AMOUNT | 2g | 4g | 6g | 8g | |
FIG. 10
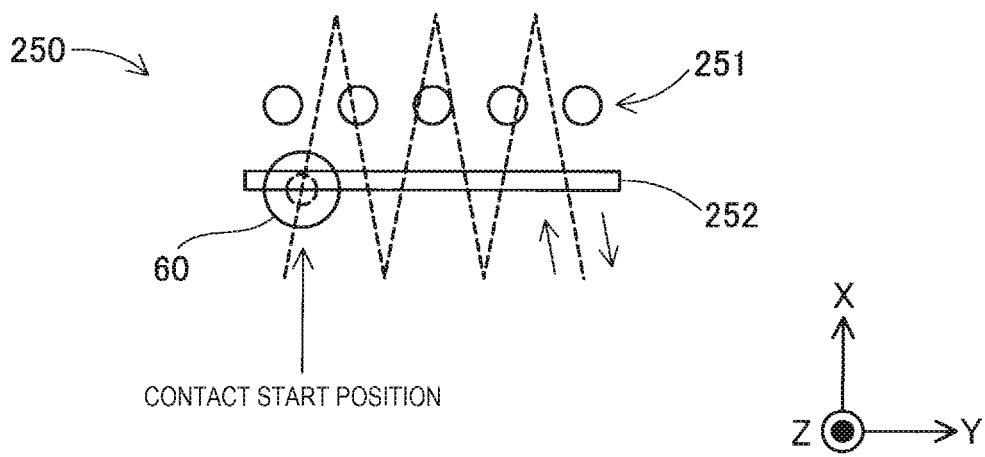
FIG. 11
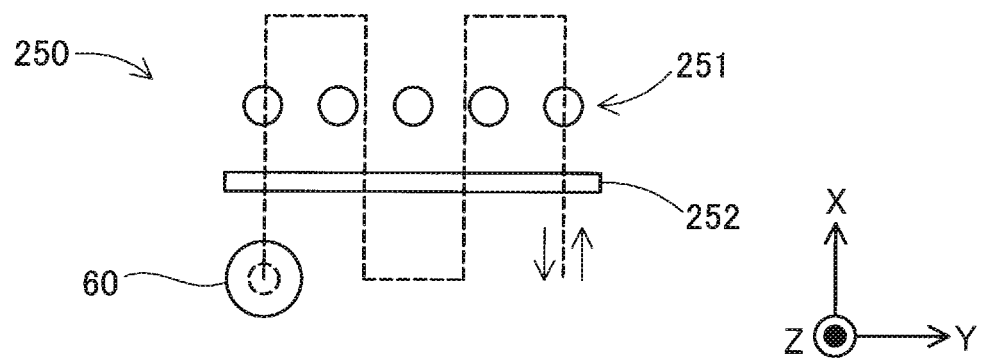

| TB2 | | | | |
|---|---|---|---|---|
| MATERIAL A | | | | |
| CUMULATIVE EJECTION AMOUNT | 1000g | 5000g | 10000g | 50000g |
| CLEANING FREQUENCY | EVERY 50g | EVERY 40g | EVERY 30g | EVERY 20g |
| MATERIAL B | | | | |
| CUMULATIVE EJECTION AMOUNT | 800g | 4000g | 8000g | 40000g |
| CLEANING FREQUENCY | EVERY 40g | EVERY 30g | EVERY 20g | EVERY 10g |

THREE-DIMENSIONAL SHAPING DEVICE AND METHOD FOR MANUFACTURING THREE-DIMENSIONAL SHAPED OBJECT PRELIMINARY

The present application is based on, and claims priority from JP Application Serial Number 2021-191206, filed Nov. 25, 2021, the disclosure of which is hereby incorporated by reference herein in its entirety.

BACKGROUND

1. Technical Field

The present disclosure relates to a three-dimensional shaping device and a method for manufacturing a three-dimensional shaped object.

2. Related Art

JP-A-2006-192710 (Patent Literature 1) discloses a technique in which a molten thermoplastic material is extruded onto a base from an extrusion nozzle that performs scanning in accordance with preset shape data, and a three-dimensional object is formed by further stacking a molten material on a material cured on the base. JP-T-2010-530326 (Patent Literature 2) discloses a three-dimensional shaping device provided with an edge cleaning assembly having a flicker plate and a brush. The three-dimensional shaping device cleans an extrusion head by bringing the extrusion head into contact with the flicker plate and the brush.

When a device in which a molten thermoplastic material is extruded from a nozzle and stacked as disclosed in Patent Literature 1 is used for a certain period of time, the thermoplastic material may be deposited in a nozzle flow path or a nozzle opening, and nozzle clogging may occur unexpectedly. In order to prevent such unexpected nozzle clogging, there is a demand for a technique in which the use of a nozzle can be managed. When nozzle clogging occurs, it is effective to clean the nozzle as disclosed in Patent Literature 2. However, a waste material adhering to a cleaning mechanism may adhere to the nozzle again to induce nozzle clogging.

SUMMARY

According to a first aspect of the present disclosure, there is provided a three-dimensional shaping device. The three-dimensional shaping device includes an ejection unit that is provided with a nozzle and a plasticizing mechanism configured to plasticize a plasticizing material to generate a shaping material and that is configured to eject the shaping material from the nozzle; a stage on which the shaping material is stacked; a drive unit configured to change a relative position between the ejection unit and the stage; a cleaning mechanism provided with a brush and a blade; and a control unit configured to execute a cleaning processing of cleaning the nozzle and control the ejection unit and the drive unit to stack a layer on the stage. The brush and the blade are disposed at a height at which the brush and the blade are contactable with the nozzle, and the brush and the blade have a melting point higher than a plasticizing temperature of the plasticizing material and a hardness lower than a hardness of the nozzle. The control unit executes a cleaning operation of bringing at least one of the brush and the blade into contact with the nozzle by causing the nozzle to reciprocate in a manner in which the nozzle crosses the cleaning mechanism for a plurality of times in the cleaning processing, the control unit causes the nozzle to reciprocate such that the nozzle comes into contact with the brush or the blade at different positions in the cleaning operation, and the control unit records at least one of material information on a type of the plasticizing material, a cumulative ejection amount of the shaping material ejected from the nozzle, and a use time of the nozzle in association with the nozzle.

According to a second aspect of the present disclosure, there is provided a method for manufacturing a three-dimensional shaped object in a three-dimensional shaping device. The three-dimensional shaping device includes an ejection unit that is provided with a nozzle and a plasticizing mechanism configured to plasticize a plasticizing material to generate a shaping material and that is configured to eject the shaping material from the nozzle; a stage on which the shaping material is stacked; a drive unit configured to change a relative position between the ejection unit and the stage; and a cleaning mechanism provided with a brush and a blade. The brush and the blade are disposed at a height at which the brush and the blade are contactable with the nozzle, and the brush and the blade have a melting point higher than a plasticizing temperature of the plasticizing material and a hardness lower than a hardness of the nozzle. The manufacturing method includes: a stacking step of stacking a layer on the stage by controlling the ejection unit and the drive unit; a cleaning step of executing a cleaning operation of bringing at least one of the brush and the blade into contact with the nozzle by causing the nozzle to reciprocate in a manner in which the nozzle crosses the cleaning mechanism for a plurality of times. In the cleaning step, the nozzle reciprocates such that the nozzle comes into contact with the brush or the blade at different positions in the cleaning operation, and at least one of material information on a type of the plasticizing material, a cumulative ejection amount of the shaping material ejected from the nozzle, and a use time of the nozzle is recorded in association with the nozzle.

BRIEF DESCRIPTION OF THE DRAWINGS

FIG. 9 is a diagram showing an example of a cleaning condition table.

FIG. 10 is a diagram illustrating a reciprocating operation of the nozzle.

FIG. 11 is a diagram illustrating another example of the reciprocating operation of the nozzle.

DESCRIPTION OF EXEMPLARY EMBODIMENTS

A. First Embodiment

Figure 1:
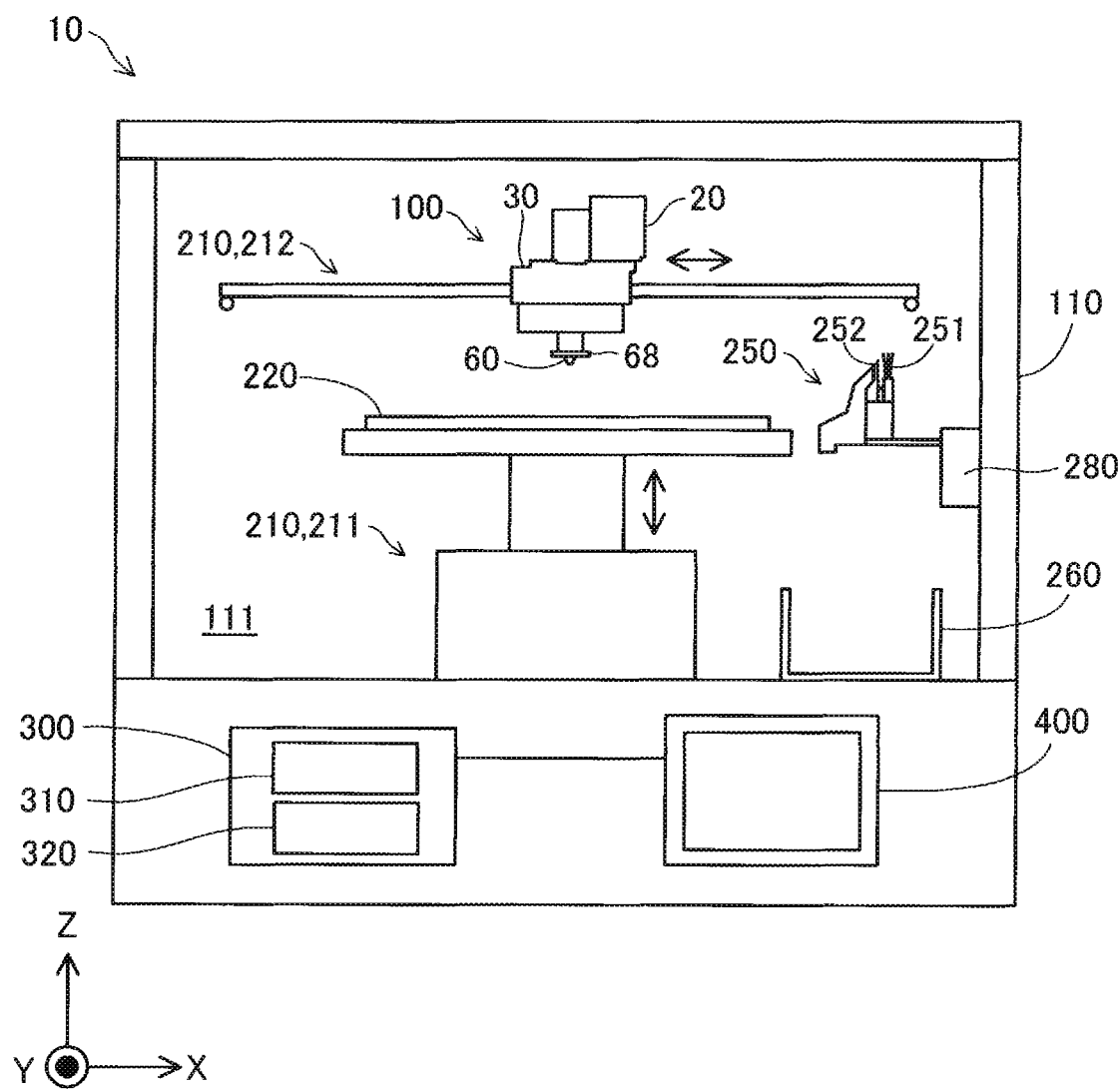
FIG. 1 is a diagram showing a schematic configuration of a three-dimensional shaping device according to a first embodiment.

FIG. 1 is a diagram showing a schematic configuration of a three-dimensional shaping device 10 according to a first embodiment. FIG. 1 shows arrows along X, Y, and Z directions that are orthogonal to one another. The X, Y, and Z directions are directions along an X axis, a Y axis, and a Z axis that are three spatial axes orthogonal to one another, and the X, Y, and Z directions respectively include directions on one side along the X axis, the Y axis, and the Z axis and directions opposite thereto. The X axis and the Y axis are axes along a horizontal plane, and the Z axis is an axis along a vertical line. −Z direction is a vertical direction, and +Z direction is a direction opposite to the vertical direction. −Z direction is also referred to as "lower", and +Z direction is also referred to as "upper". X, Y, and Z directions in FIG. 1 and X, Y, and Z directions in other drawings represent the same directions.

The three-dimensional shaping device 10 according to the present embodiment includes an ejection unit 100, a material storage unit 20, a housing 110, a drive unit 210, a stage 220, a cleaning mechanism 250, a control unit 300, and a display device 400 serving as a notification unit.

The ejection unit 100 includes a plasticizing mechanism 30 that plasticizes at least a part of a plasticizing material supplied from the material storage unit 20 to generate a shaping material, and a nozzle 60. The ejection unit 100 ejects the shaping material plasticized by the plasticizing mechanism 30 from the nozzle 60 toward the stage 220. The ejection unit 100 is also referred to as an ejection head, a discharge unit, a discharge head, an extrusion unit, an extrusion head, or is simply referred to as a head. In the present specification, "ejection" also includes the meaning of "discharge" or "extrusion".

The housing 110 has a shaping space 111 therein. The stage 220 on which the shaping material is stacked is disposed in the shaping space 111. The housing 110 may be provided with, for example, an opening portion that allows the shaping space 111 to communicate with the outside, a door that opens and closes the opening portion, and the like. By opening the door to bring the opening portion into an open state, a user can take out a shaped object shaped on the stage 220 from the opening portion.

The drive unit 210 changes a relative position between the ejection unit 100 and the stage 220. In the present embodiment, the drive unit 210 includes a first drive unit 211 that moves the stage 220 along the Z direction, and a second drive unit 212 that moves the ejection unit 100 along the X direction and the Y direction. The first drive unit 211 is implemented as an elevating device, and includes a motor for moving the stage 220 in the Z direction. The second drive unit 212 is implemented as a horizontal conveyance device, and includes a motor for moving the ejection unit 100 in a sliding manner along the X direction and a motor for moving the ejection unit 100 in a sliding manner along the Y direction. Each motor is driven under the control of the control unit 300. In another embodiment, the drive unit 210 may be configured to move the stage 220 or the ejection unit 100 in three directions of X, Y, and Z, or may be configured to move the stage 220 along the X direction and the Y direction and move the ejection unit 100 along the Z direction.

The cleaning mechanism 250 includes a brush 251 and a blade 252 for cleaning the nozzle 60. The cleaning mechanism 250 is disposed in a region different from the stage 220 in a horizontal direction. The cleaning mechanism 250 is disposed at a height at which the brush 251 and the blade 252 can come into contact with the nozzle 60 in the vertical direction. In the present embodiment, the cleaning mechanism 250 is coupled to the housing 110 via a support portion 280. A purge waste container 260 is provided below the cleaning mechanism 250. A waste material removed by the cleaning mechanism 250 falls into and is collected in the purge waste container 260. The blade 252 is also referred to as a flicker plate. The cleaning mechanism 250 is also referred to as a tip wipe assembly.

The control unit 300 is implemented by a computer including one or more processors 310, a storage unit 320 including a main storage device and an auxiliary storage device, and an input and output interface that performs signal input and output with the outside. In the present embodiment, the processor 310 executes a program stored in the storage unit 320, so that the control unit 300 can control the ejection unit 100 and the drive unit 210 based on shaping data for shaping a three-dimensional shaped object to perform a three-dimensional shaping processing to be described later and a cleaning processing for cleaning the nozzle. In addition, the control unit 300 has a function of recording at least one of material information on a type of the plasticizing material, a cumulative ejection amount of the shaping material ejected from the nozzle 60, and a use time of the nozzle 60 in association with the nozzle 60. The control unit 300 may be implemented by a combination of a plurality of circuits instead of a computer.

The display device 400 is coupled to the control unit 300. The display device 400 includes, for example, a liquid crystal display or an organic EL display. Although the display device 400 is provided in the housing 110 in the present embodiment, the display device 400 may be disposed separately from the housing 110.

Figure 2:
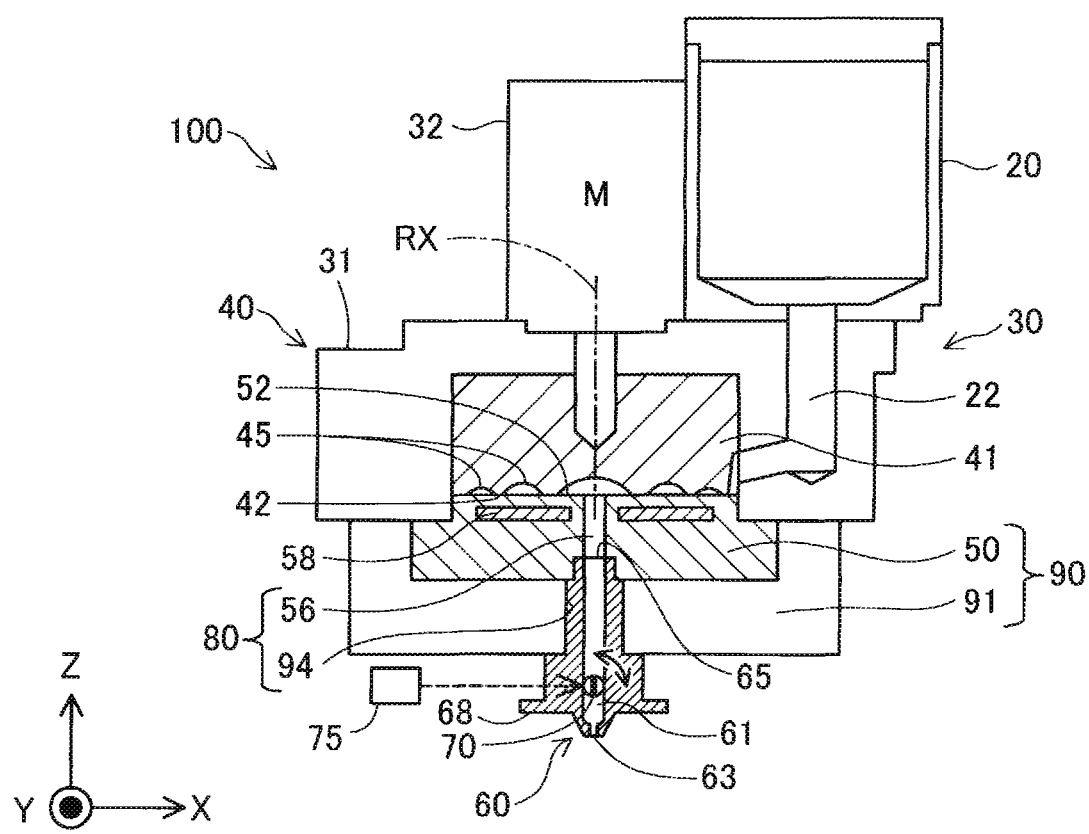
FIG. 2 is a diagram showing a schematic configuration of an ejection unit.

FIG. 2 is a diagram showing a schematic configuration of the ejection unit 100. The ejection unit 100 includes the plasticizing mechanism 30, the nozzle 60, and a flow rate adjusting unit 70. The plasticizing mechanism 30 includes a material conveying mechanism 40 and a heating block 90. A material stored in the material storage unit 20 is supplied to the ejection unit 100. Under the control of the control unit 300, the ejection unit 100 plasticizes at least a part of the material supplied from the material storage unit 20 in the plasticizing mechanism 30 to generate a shaping material, and ejects the generated shaping material onto the stage 220 from the nozzle 60 to stack the shaping material. The material stacked on the stage 220 may be referred to as a stacked material. A three-dimensional shaping method for shaping a three-dimensional shaped object by ejecting a material from the nozzle 60 and stacking the ejected material may be referred to as a material extrusion (ME) method.

In the present embodiment, "plasticizing" is a concept including melting, and refers to a change from a solid state to a state having fluidity. Specifically, in a case of a material in which glass transition occurs, the term "plasticizing" refers to setting a temperature of the material to be equal to or higher than a glass transition point. In a case of a material in which no glass transition occurs, the term "plasticizing" refers to setting a temperature of the material to be equal to or higher than a melting point.

A material in a state of pellets, powder, or the like is stored in the material storage unit 20 according to the present embodiment. In the present embodiment, a material stored in the material storage unit 20 is a pellet-shaped resin. The material storage unit 20 according to the present embodiment is implemented by a hopper. The material stored in the material storage unit 20 is supplied to the material conveying mechanism 40 of the plasticizing mechanism 30 via a supply path 22 that is provided below the material storage unit 20 in a manner of coupling the material storage unit 20 and the ejection unit 100.

The heating block 90 has a heater 58. The heater 58 is controlled by the control unit 300, and is heated to a plasticizing temperature for plasticizing a material. The plasticizing temperature varies depending on a type of a material to be used, and is, for example, a glass transition point or a melting point of the material. When the material is an ABS resin, the plasticizing temperature is set to, for example, about 110° C. which is a glass transition point of the ABS resin. The heating block 90 is provided with a through hole 80. The through hole 80 is formed to allow attachment and detachment of the nozzle 60. The material conveying mechanism 40 conveys the shaping material toward a nozzle flow path 61 of the nozzle 60 attached to the through hole 80 of the heating block 90. The plasticizing mechanism 30 conveys the material supplied from the material storage unit 20 to the material conveying mechanism 40 toward the nozzle flow path 61 of the nozzle 60 using the material conveying mechanism 40, and plasticizes the material while heating the material using the heat of the heating block 90.

The material conveying mechanism 40 according to the present embodiment includes a screw case 31, a screw 41 housed in the screw case 31, and a drive motor 32 that drives the screw 41. The heating block 90 according to the present embodiment includes a case portion 91 having an opening portion 94, and a barrel 50 disposed in the case portion 91. The barrel 50 is provided with a communication hole 56. The through hole 80 according to the present embodiment is formed by the opening portion 94 and the communication hole 56 communicating with each other. The above-described heater 58 is built in the barrel 50. The screw 41 according to the present embodiment is a so-called flat screw, and may be referred to as a "scroll".

The screw 41 has a substantially cylindrical shape of which a height in a direction along a central axis RX of the screw 41 is smaller than a diameter. The screw 41 has a groove forming surface 42 on a surface facing the barrel 50 on which screw grooves 45 are formed. The groove forming surface 42 faces a screw facing surface 52 of the barrel 50 which will be described later. The central axis RX according to the present embodiment coincides with a rotation axis of the screw 41. A configuration of the screw 41 will be described in detail later.

The drive motor 32 is coupled to a surface of the screw 41 opposite to the groove forming surface 42. The drive motor 32 is driven under the control of the control unit 300. The screw 41 is rotated around the central axis RX by a torque generated by the rotation of the drive motor 32. The drive motor 32 may not be directly coupled to the screw 41, and may be coupled to the screw 41 via, for example, a speed reducer.

The barrel 50 has the screw facing surface 52 facing the groove forming surface 42 of the screw 41. The case portion 91 is disposed in a manner of covering a surface of the barrel 50 opposite to the screw facing surface 52, that is, a lower surface of the barrel 50. The communication hole 56 and the opening portion 94 described above are provided at positions overlapping the central axis RX of the screw 41. That is, the through hole 80 is located at a position overlapping the central axis RX.

As described above, the nozzle 60 is detachably attached to the through hole 80 of the heating block 90. The nozzle 60 is also referred to as a nozzle tip. The nozzle 60 is provided with the nozzle flow path 61 described above. The nozzle flow path 61 has a nozzle opening 63 at a tip end of the nozzle 60, and has an inflow port 65 at a rear end of the nozzle 60. The nozzle opening 63 is located at a position in the −Z direction of the inflow port 65. The nozzle 60 according to the present embodiment discharges a material flowing into the nozzle flow path 61 through the through hole 80 and the inflow port 65 from the nozzle opening 63 toward the stage 220. A heater for heating the material in the nozzle flow path 61 may be provided around the nozzle flow path 61.

The nozzle 60 has a shield 68 above the tip end of the nozzle 60. More specifically, the shield 68 is disposed between the nozzle opening 63 and the heating block 90 on an outer periphery of the nozzle 60. The shield 68 has a disk shape along the horizontal direction. The shield 68 prevents the heat of the heating block 90 from being transferred to the stacked material.

The flow rate adjusting unit 70 changes an opening degree of the nozzle flow path 61 by rotating the flow rate adjusting unit 70 in the nozzle flow path 61. In the present embodiment, the flow rate adjusting unit 70 is implemented by a butterfly valve. The flow rate adjusting unit 70 is driven by a valve drive unit 75 under the control of the control unit 300. The valve drive unit 75 is implemented by, for example, a stepping motor. The control unit 300 can adjust a flow rate of the shaping material flowing from the material conveying mechanism 40 to the nozzle 60, that is, a flow rate of the shaping material ejected from the nozzle 60, by controlling a rotation angle of the butterfly valve using the valve drive unit 75. The flow rate adjusting unit 70 can not only adjust the flow rate of the shaping material but also control on and off of an outflow of the shaping material.

Figure 3:
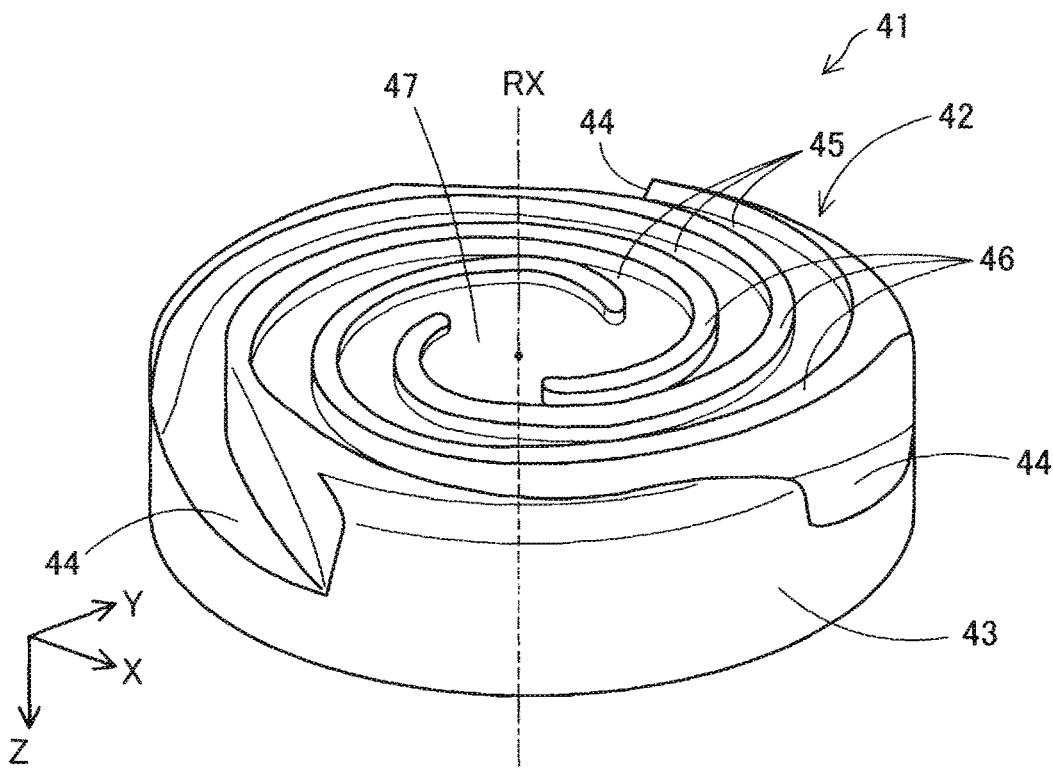
FIG. 3 is a schematic perspective view showing a screw.

FIG. 3 is a schematic perspective view showing a structure of the screw 41 at the groove forming surface 42 side. In FIG. 3, a position of the central axis RX of the screw 41 is indicated by a dashed line. As described above, the screw grooves 45 are provided on the groove forming surface 42. A screw center portion 47 that is a center portion of the groove forming surface 42 of the screw 41 is formed as a recess to which one ends of the screw grooves 45 are coupled. The screw center portion 47 faces the communication hole 56 of the barrel 50. The screw center portion 47 intersects the central axis RX.

The screw groove 45 of the screw 41 forms a so-called scroll groove. The screw groove 45 extends in a vortex shape from the screw center portion 47 toward an outer periphery of the screw 41 in a manner of drawing an arc. The screw groove 45 may be formed to extend in an involute curve shape or a spiral shape. The groove forming surface 42 is provided with ridge portions 46 that form side wall portions of the respective screw grooves 45 and extend along the respective screw grooves 45. Each of the screw grooves 45 is continuous up to a material introduction port 44 formed on a side surface 43 of the screw 41. The material introduction port 44 is a portion that receives a material supplied via the supply path 22 of the material storage unit 20.

FIG. 3 shows an example of the screw 41 having three screw grooves 45 and three ridge portions 46. The number of the screw grooves 45 and the number of the ridge portions 46 provided at the screw 41 are not limited to three. The screw 41 may be provided with only one screw groove 45, or two or a plurality of screw grooves 45. FIG. 3 shows an example of the screw 41 in which the material introduction port 44 is formed at three positions. The number of the material introduction ports 44 provided in the screw 41 is not limited to three. The screw 41 may be provided with one material introduction port 44, or two or a plurality of material introduction ports 44.

Figure 4:
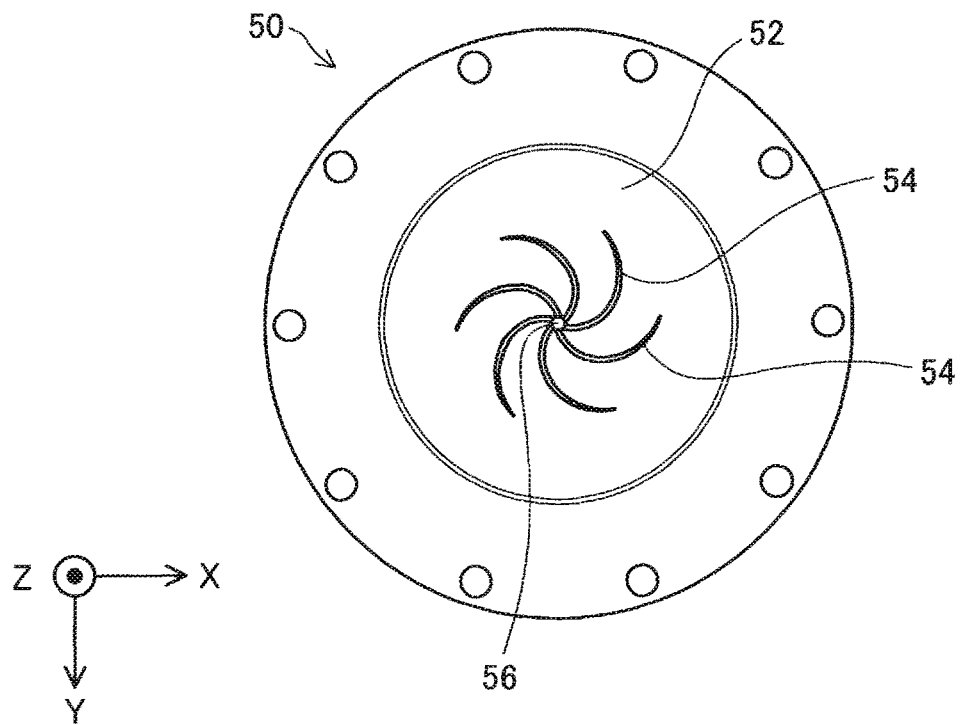
FIG. 4 is a top view showing a barrel.

FIG. 4 is a top view showing a configuration of the barrel 50 at the screw facing surface 52 side. As described above, the communication hole 56 is formed in the center of the screw facing surface 52. A plurality of guide grooves 54 are formed around the communication hole 56 on the screw facing surface 52. Each of the guide grooves 54 has one end coupled to the communication hole 56. The guide grooves 54 extend in a vortex shape from the communication hole 56 toward an outer periphery of the screw facing surface 52. Each of the guide grooves 54 has a function of guiding the shaping material to the communication hole 56. One end of the guide groove 54 may not be coupled to the communication hole 56. The guide grooves 54 may not be formed in the barrel 50.

Figures 5, 6:
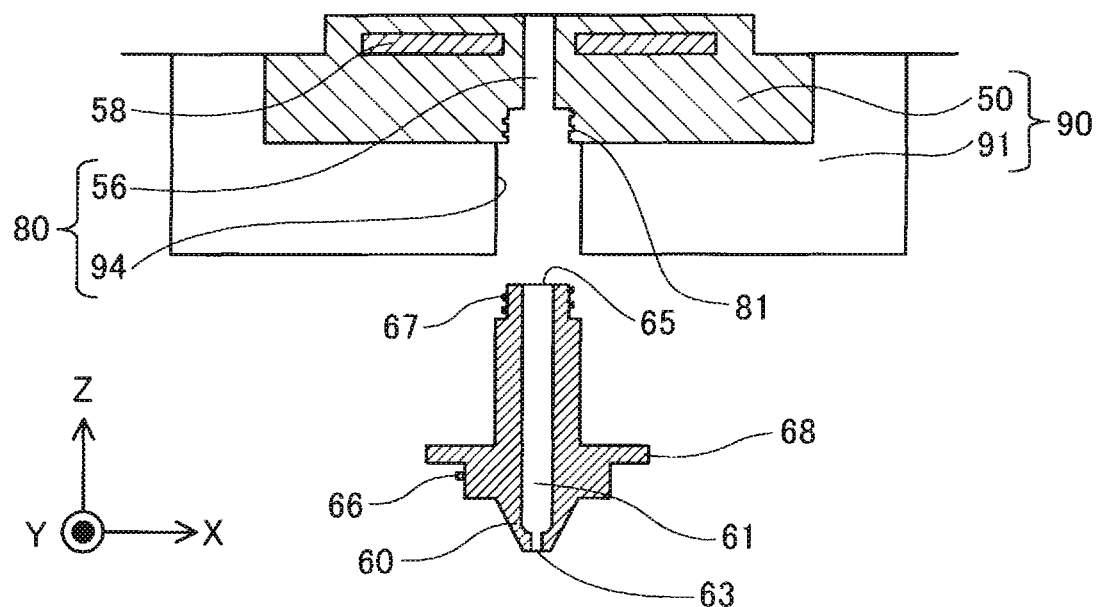
FIG. 5 is a diagram illustrating attachment of a nozzle to and detachment of the nozzle from a through hole.
FIG. 6 is a diagram showing an example of nozzle information.

FIG. 5 is a diagram illustrating attachment of the nozzle 60 to and detachment of the nozzle 60 from the through hole 80. FIG. 5 shows the nozzle 60 in a state of being removed from the through hole 80. In the present embodiment, a nozzle screw portion 67 is formed at a portion of the nozzle 60 to be coupled to the through hole 80, and a through hole screw portion 81 to be screwed with the nozzle screw portion 67 is provided at a portion of the through hole 80 to be coupled to the nozzle 60. The nozzle 60 is inserted into the through hole 80, and is attached to the heating block 90 by screwing the nozzle screw portion 67 and the through hole screw portion 81 together. In addition, the nozzle 60 is removed from the heating block 90 by unscrewing the nozzle screw portion 67 and the through hole screw portion 81 and pulling out the nozzle 60 from the through hole 80. In the present embodiment, the nozzle 60 is positioned at a lower portion of the barrel 50 and is attached to the heating block 90 so that the communication hole 56 and the nozzle flow path 61 communicate with each other.

The nozzle 60 has the shield 68. The shield 68 prevents the heat of the heating block 90 from being transferred to the stacked material. Specifically, the shield 68 is formed as a portion having a larger area of a cross section along the X direction and the Y direction than other portions in the Z direction which is a direction along the nozzle flow path 61. In an attached state, the shield 68 is positioned between the heating block 90 and the stacked material, thereby preventing heat transfer from the heating block 90 to the stacked material.

The shield 68 is generally formed of, for example, stainless steel or the like having a low emissivity. The shield 68 may be formed of, for example, a material other than stainless steel. For example, when the shield 68 is formed of aluminum or the like having a lower emissivity than stainless steel, an effect of preventing heat transfer to the stacked material due to heat radiation of the heating block 90 is further improved. For example, when the shield 68 is generally formed of polytetrafluoroethylene (PTFE) or the like having a low thermal conductivity, thermal conduction from the heating block 90 to the shield 68 is further prevented. The shield 68 may be formed integrally with the nozzle 60, or may be formed separately from the nozzle 60. Further, the shield 68 may be formed of a plurality of materials.

The nozzle 60 according to the present embodiment is provided with a memory 66 implemented by an IC chip serving as a storage medium. The memory 66 is positioned between the nozzle opening 63 and the shield 68 in the Z direction that is the direction along the nozzle flow path 61. Accordingly, in an attached state, the shield 68 is positioned between the memory 66 and the heating block 90. Therefore, heat transfer from the heating block 90 to the memory 66 is prevented by the shield 68 in a similar manner to the effect that the heat transfer from the heating block 90 to the stacked material is prevented by the shield 68.

When the nozzle 60 is attached to the heating block 90, the memory 66 is electrically coupled to the control unit 300 via a wire (not shown) and a coupling unit. The memory 66 functions as a nozzle information storage unit that stores nozzle information of the nozzle 60.

FIG. 6 is a diagram showing an example of the nozzle information. In the present embodiment, nozzle identification information, material information, a cumulative ejection amount, a nozzle use time, and a cleaning processing execution history are stored in the memory 66 as the nozzle information.

The nozzle identification information is information for uniquely identifying the nozzle 60. For example, the nozzle identification information is recorded at the time of manufacturing the nozzle 60.

The material information is information on a type of the plasticizing material. More specifically, the material information is information indicating a type of the plasticizing material which is a raw material of the shaping material discharged from the nozzle 60. The material information is recorded by the control unit 300. More specifically, the control unit 300 receives an operation of designating a type of the plasticizing material from a user, and records the information indicating a type of the plasticizing material in the memory 66 as the material information.

The cumulative ejection amount is information indicating a total amount of the shaping material ejected from the nozzle 60. In the present embodiment, the cumulative ejection amount includes an ejection amount of the shaping material ejected in a stacking processing executed during a three-dimensional shaping processing to be described later and an ejection amount of the shaping material discharged in a cleaning processing. The cumulative ejection amount is recorded by the control unit 300 in the three-dimensional shaping processing to be described later. In another embodiment, the ejection amount of the shaping material discharged in the cleaning processing may not be included in the cumulative ejection amount. In the present embodiment, the ejection amount is represented by a weight of the shaping material. In another embodiment, the ejection amount may be represented by a volume or a length of the shaping material.

The nozzle use time is a total time of a time during which a three-dimensional shaped object is shaped using the nozzle 60. In the present embodiment, the nozzle use time includes a time during which the shaping material is ejected from the nozzle 60 in the stacking processing executed during the three-dimensional shaping processing to be described later and a time during which the shaping material is ejected from the nozzle 60 in the cleaning processing. The control unit 300 counts a use time of the nozzle 60, and thus the nozzle use time is recorded by the control unit 300. In another embodiment, the time during which the shaping material is ejected in the cleaning processing may not be included in the nozzle use time.

The cleaning processing execution history is information on an execution history of the cleaning processing. In the present embodiment, the cleaning processing execution history includes information indicating a cumulative ejection amount when the cleaning processing is executed. The cleaning processing execution history may include information on date and time when the cleaning processing is executed. The cleaning processing execution history is recorded by the control unit 300 in the three-dimensional shaping processing to be described later.

The control unit 300 reads the nozzle information from the memory 66, and determines a mode of a cleaning operation or an execution timing of the cleaning processing based on at least one of the material information, the cumulative ejection amount, and the nozzle use time. In the present embodiment, the control unit 300 determines a mode of the cleaning operation based on the material information and the cumulative ejection amount.

The control unit 300 can acquire the nozzle information from the memory 66 provided in the nozzle 60 and display each piece of information included in the nozzle information on the display device 400. In this manner, identification information of the nozzle 60 that is currently attached to the three-dimensional shaping device 10, a type of the shaping material ejected from the nozzle 60, the cumulative ejection amount, the nozzle use time, and the cleaning processing execution history can be presented to a user.

Figure 7:
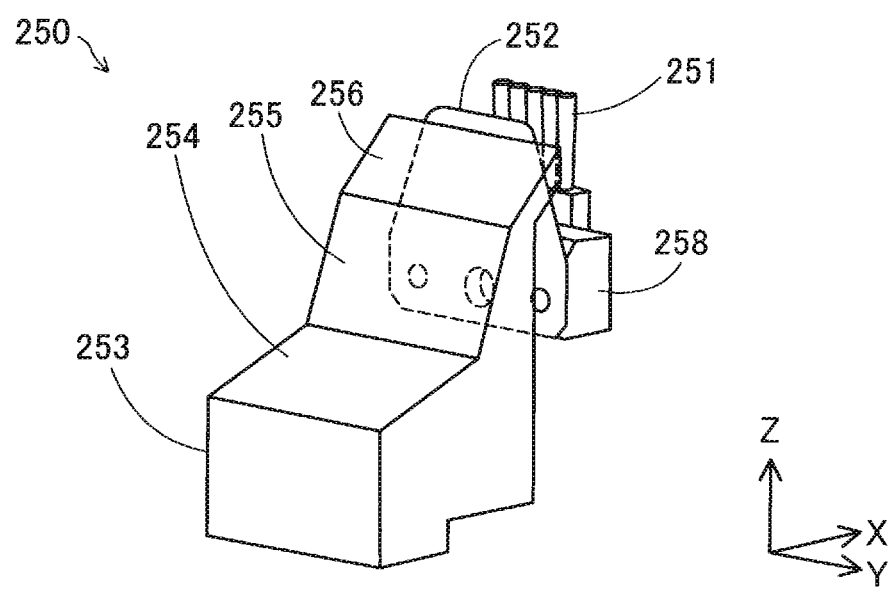
FIG. 7 is a diagram illustrating a schematic configuration of a cleaning mechanism.

FIG. 7 is a diagram illustrating a schematic configuration of the cleaning mechanism 250. As described above, the cleaning mechanism 250 includes the brush 251 and the blade 252. The brush 251 is formed by arranging a plurality of hair bundles along the Y direction. The blade 252 is a plate-shaped member extending along the Z direction and the Y direction. A tip end of the brush 251 and a tip end of the blade 252 are directed in the +Z direction. The tip end of the blade 252 is disposed lower than the tip end of the brush 251. As described above, the brush 251 and the blade 252 are disposed at a height at which the brush 251 and the blade 252 can come into contact with the nozzle 60. In addition, the tip end of the brush 251 is disposed at a height at which the tip end of the brush 251 can come into contact with the shield 68 provided at the nozzle 60, and the tip end of the blade 252 is disposed at a height at which the tip end of the blade 252 does not come into contact with the shield 68. In the present embodiment, the brush 251 and the blade 252 are integrated by a fixture 258, and can be replaced at the same time when the brush 251 and the blade 252 are consumed. The brush 251 and the blade 252 may be individually replaced.

The brush 251 and the blade 252 each have a melting point higher than a plasticizing temperature of the plasticizing material plasticized in the ejection unit 100. The brush 251 and the blade 252 each have hardness lower than the hardness of the nozzle 60. In the present embodiment, the hardness refers to Vickers hardness. Further, in the present embodiment, an elastic modulus of the blade 252 is higher than an elastic modulus of the brush 251. In the present embodiment, the elastic modulus refers to a Young's modulus. The nozzle 60 is formed of, for example, a metal such as cemented carbide, tool steel, and SUS, and the brush 251 and the blade 252 are formed of, for example, a metal such as SUS, iron, or brass. The brush 251 and the blade 252 may be made of resin. The brush 251 may be formed of natural fiber or chemical fiber, and the blade 252 may be formed of ceramic. In another embodiment, the elastic modulus of the blade 252 and the elastic modulus of the brush 251 may be the same, or the elastic modulus of the brush 251 may be higher than the elastic modulus of the blade 252.

The cleaning mechanism 250 further includes a purge unit 253. The purge unit 253 is also referred to as a purge ledge. In the present embodiment, the purge unit 253, the blade 252, and the brush 251 are arranged in this order along the +X direction. That is, the blade 252 is disposed between the purge unit 253 and the brush 251. A tip end of the purge unit 253 in the +Z direction is lower than the tip end of the blade 252. In the cleaning processing to be described later, a waste material ejected from the nozzle 60 falls onto the purge unit 253, is collected in a spherical shape on the purge unit 253, and falls into the purge waste container 260. An upper surface of the purge unit 253 is formed as an inclined surface in order to promote the waste material to fall down. More specifically, the purge unit 253 includes a first inclined surface 254, a second inclined surface 255, and a third inclined surface 256 in an order from the farthest one from the blade 252 and in an order from the lowest position in the vertical direction. The first inclined surface 254, the second inclined surface 255, and the third inclined surface 256 are each inclined such that a position of an end portion in the +X direction is higher than a position of an end portion in the −X direction. In the present embodiment, inclination angles of the second inclined surface 255 and the third inclined surface 256 relative to a horizontal plane is larger than an inclination angle of the first inclined surface 254 relative to the horizontal plane.

Figure 8:
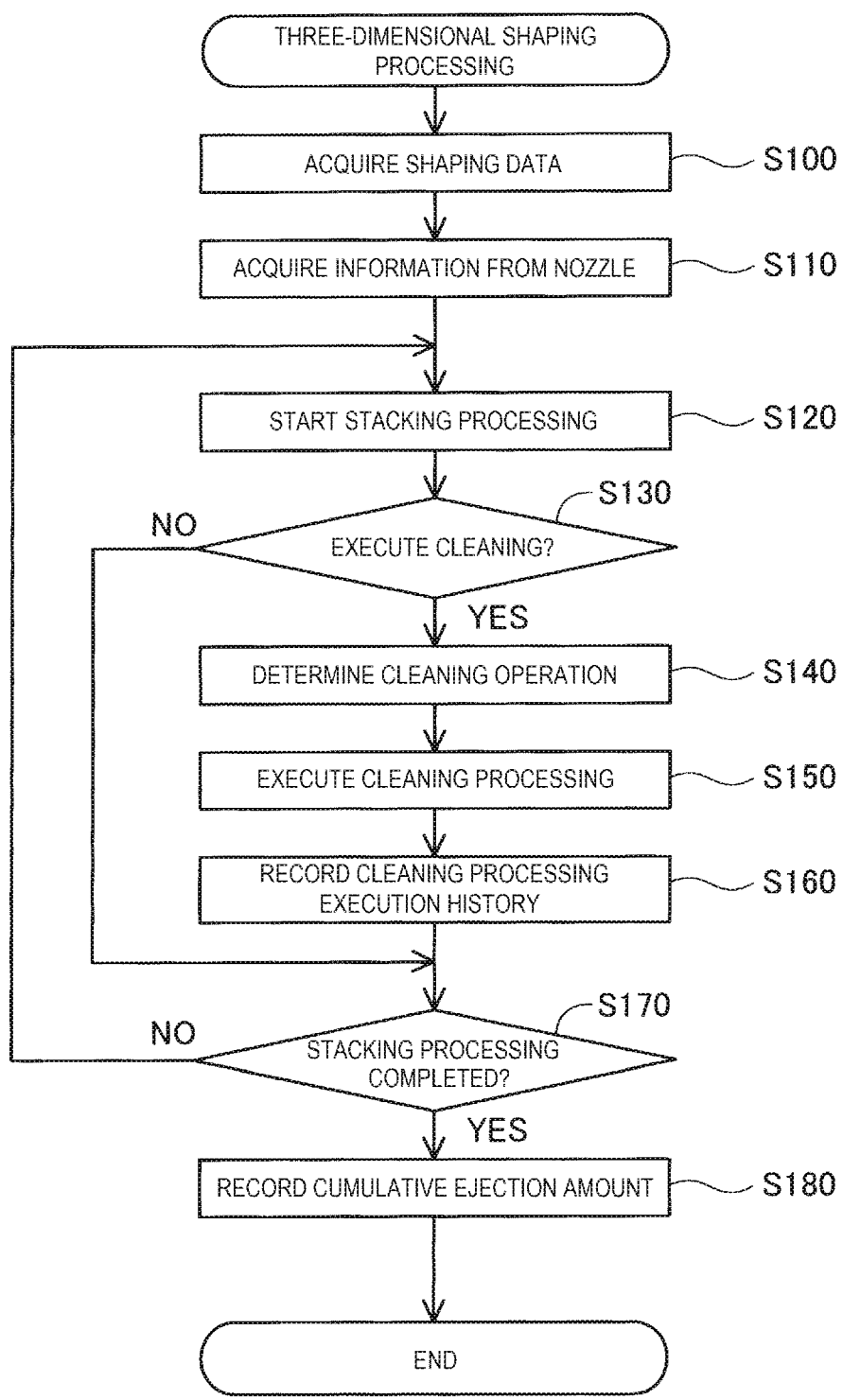
FIG. 8 is a flowchart showing a three-dimensional shaping processing representing a method for manufacturing a three-dimensional shaped object.

FIG. 8 is a flowchart showing a three-dimensional shaping processing representing a method for manufacturing a three-dimensional shaped object. The three-dimensional shaping processing is executed when the control unit 300 of the three-dimensional shaping device 10 receives a predetermined operation for shaping a three-dimensional shaped object from a user.

In step S100, the control unit 300 acquires shaping data from an external computer, a recording medium, or the like. The shaping data includes shaping path data indicating a movement path of the nozzle 60 for each layer for forming a three-dimensional shaped object. The shaping path data is associated with ejection amount data indicating an ejection amount of a material to be ejected from the nozzle 60.

In step S110, the control unit 300 acquires the nozzle information from the memory 66 of the nozzle 60, and stores the nozzle information in the storage unit 320.

In step S120, the control unit 300 starts to execute a stacking processing. The stacking processing is a processing of shaping a three-dimensional shaped object including a plurality of layers by controlling the drive unit 210 and the ejection unit 100 in accordance with the shaping data and ejecting a shaping material from the ejection unit 100 onto the stage 220 for each layer. In the stacking processing, the control unit 300 updates a cumulative ejection amount by sequentially adding an ejection amount of the shaping material ejected from the nozzle 60 to a cumulative ejection amount stored in the storage unit 320. Step S120 is also referred to as a stacking step.

During the execution of the stacking processing, in step S130, the control unit 300 determines whether to execute a cleaning processing. For example, the control unit 300 determines to execute the cleaning processing when an ejection abnormality of the shaping material is detected in the plasticizing mechanism 30, when a predetermined number of layers are formed, when a type of the shaping material is changed, when a command for instructing cleaning included in the shaping data is received, or the like. In the present embodiment, the control unit 300 determines to execute the cleaning processing when a predetermined number of layers are formed.

When it is determined in step S130 that the cleaning processing is to be executed, in step S140, the control unit 300 determines a mode of a cleaning operation to be executed in the cleaning processing to be described later based on the nozzle information acquired from the memory 66 and a cleaning condition table stored in the storage unit 320.

FIG. 9 is a diagram showing an example of a cleaning condition table TB1. In the cleaning condition table TB1 according to the present embodiment, a cumulative ejection amount, the number of brushing times, and a discharge amount are associated with a type of a plasticizing material specified by the material information. The number of brushing times is determined to increase as the cumulative ejection amount increases. The discharge amount is determined to increase as the cumulative ejection amount increases. The number of brushing times is the number of times at which the nozzle 60 reciprocates on the brush 251 and the blade 252 of the cleaning mechanism 250. The discharge amount is an amount at which the shaping material is discharged as a waste material from the nozzle 60 onto the purge unit 253. In step S140, the control unit 300 specifies the number of brushing times and the discharge amount corresponding to the material type included in the nozzle information acquired from the memory 66 of the nozzle 60 in step S110 and the sequentially calculated cumulative ejection amount. A combination of the number of brushing times and the discharge amount specified in this manner represents a mode of a cleaning operation in the present embodiment.

In step S150, the control unit 300 executes the cleaning processing in accordance with the mode of the cleaning operation determined in step S140. In the cleaning processing, first, the control unit 300 moves the nozzle 60 onto the purge unit 253, and discharges the shaping material as a waste material according to the discharge amount determined in step S140. The control unit 300 adds an amount of the discharged shaping material to the cumulative ejection amount. Thereafter, the nozzle 60 reciprocates on the blade 252 and the brush 251 in accordance with the number of brushing times in the cleaning operation determined in step S140. A cleaning strength increases as the number of brushing times increases, and the cleaning strength increases as the discharge amount increases. Step S150 is also referred to as a cleaning step. In another embodiment, the discharge of the waste material from the nozzle 60 may be omitted in the cleaning processing. In this case, the discharge amount may not be defined in the cleaning condition table TB1 shown in FIG. 9.

FIG. 10 is a diagram illustrating a reciprocating operation of the nozzle 60 according to the present embodiment. FIG. 10 shows the tip end of the nozzle 60 and the brush 251 and the blade 252 of the cleaning mechanism 250 as viewed from above, and a trajectory along which the nozzle 60 moves is indicated by a broken line. As shown in FIG. 10, the cleaning mechanism 250 has a longitudinal direction. In the present embodiment, the longitudinal direction is the Y direction. In the present embodiment, the control unit 300 brings the tip end of the nozzle 60 into contact with the blade 252, and then brings the tip end of the nozzle 60 into contact with the brush 251 in the cleaning operation. Thereafter, the control unit 300 causes the nozzle 60 to reciprocate in a manner in which the nozzle 60 crosses the brush 251 and the blade 252 by the number of brushing times specified in step S140. At this time, the control unit 300 causes the nozzle 60 to reciprocate along an M-shaped or W-shaped trajectory, in other words, along a trajectory indicating a triangular wave shape in the longitudinal direction of the cleaning mechanism 250 from a contact start position at which the nozzle 60 and the cleaning mechanism 250 first come into contact with each other. Accordingly, in the cleaning operation, the control unit 300 can cause the nozzle 60 to reciprocate in the X direction such that the nozzle 60 comes into contact with the brush 251 or the blade 252 at different positions each time the nozzle 60 passes through the brush 251 or the blade 252. FIG. 10 shows a reciprocating operation in a case where the number of brushing times is three. Although the control unit 300 brings the nozzle 60 into contact with both the brush 251 and the blade 252 in the cleaning operation according to the present embodiment, the control unit 300 may bring the nozzle 60 into contact with either one of the brush 251 and the blade 252.

When the cleaning processing is executed, in step S160 shown in FIG. 8, the control unit 300 records a cleaning processing execution history and the cumulative ejection amount in association with each other in the memory 66 provided in the nozzle 60. More specifically, in the present embodiment, the control unit 300 records a cumulative ejection amount at a time point when a finally executed cleaning processing is completed as the cleaning processing execution history. In another embodiment, in addition to the cumulative ejection amount or instead of the cumulative ejection amount, a nozzle use time may be recorded in association with the cleaning processing execution history.

After the cleaning processing execution history is recorded in step S160, or after it is determined in step S130 that the cleaning processing is not to be executed, in step S170, the control unit 300 determines whether the stacking processing is completed for all layers, that is, whether shaping of the three-dimensional shaped object is completed. When the stacking processing is not completed, the control unit 300 returns the processing to step S120 and continues the stacking processing. When the stacking processing is completed, in step S180, the control unit 300 records the cumulative ejection amount sequentially integrated in the stacking processing and the cleaning processing in the memory 66 provided in the nozzle 60.

According to the three-dimensional shaping device 10 of the present embodiment described above, since the control unit 300 records the identification information of the nozzle 60, the material information on the type of the plasticizing material, and the cumulative ejection amount of the shaping material in association with one another, it is possible to manage the use of the nozzle 60 so as to avoid unexpected nozzle clogging. Particularly, in the present embodiment, since the nozzle information is recorded in the memory 66 provided in the nozzle 60, even when the nozzle 60 is replaced, it is possible to execute the cleaning processing suitable for the nozzle 60 using the material information or the cumulative ejection amount recorded in the memory 66 of the replaced nozzle 60.

In the present embodiment, the nozzle 60 reciprocates such that the nozzle 60 comes into contact with the brush 251 or the blade 252 at different positions in the cleaning operation. Therefore, it is possible to prevent a waste material adhering to the cleaning mechanism 250 from re-adhering to the nozzle 60 during the cleaning processing.

In the present embodiment, the mode of the cleaning operation is determined based on the material information and the cumulative ejection amount included in the nozzle information. Therefore, for example, even when a state of deterioration or contamination of the nozzle 60 corresponding to the cumulative ejection amount differs in accordance with a material, it is possible to execute a cleaning operation suitable for the material.

In the present embodiment, the number of brushing times and the discharge amount increase as the cumulative ejection amount increases, so that the cleaning strength increases. The larger the cumulative ejection amount is, the more the deterioration or contamination of the nozzle progresses. Therefore, it is possible to prevent unexpected nozzle clogging of the nozzle and improve shaping quality by increasing the cleaning strength as the cumulative ejection amount increases.

In the present embodiment, the elastic modulus of the blade 252 provided in the cleaning mechanism 250 is higher than the elastic modulus of the brush 251. Therefore, it is easy to remove a material adhering to the nozzle 60 by the blade 252.

In the present embodiment, since the tip end of the blade 252 is disposed lower than the tip end of the brush 251 in the cleaning mechanism 250, a material adhering to the tip end of the nozzle 60 can be efficiently removed by the blade 252.

In the present embodiment, since the tip end of the brush 251 is disposed at a height at which the tip end can come into contact with the shield 68 and the tip end of the blade 252 is disposed at a height at which the tip end does not contact the shield 68, it is possible to remove a material adhering to the shield 68 by the brush 251.

In the present embodiment, the control unit 300 brings the tip end of the nozzle 60 into contact with the blade 252, removes the shaping material adhering to the tip end of the nozzle 60, and then brings the tip end of the nozzle 60 into contact with the brush 251 in the cleaning operation, so that the nozzle 60 can be efficiently cleaned.

In the present embodiment, the control unit 300 ejects a waste material from the nozzle 60 onto the purge unit 253 and then moves the nozzle 60 toward the brush 251 and the blade 252 in the cleaning processing, so that the nozzle 60 can be cleaned after the shaping material remaining in the nozzle flow path 61 is removed.

Although the stacking processing and the cleaning processing are repeatedly executed during the shaping of the three-dimensional shaped object in the present embodiment, the cleaning processing may be executed not only during the shaping but also before the shaping of the three-dimensional shaped object is started or after the shaping of the three-dimensional shaped object is completed.

Figure 12:
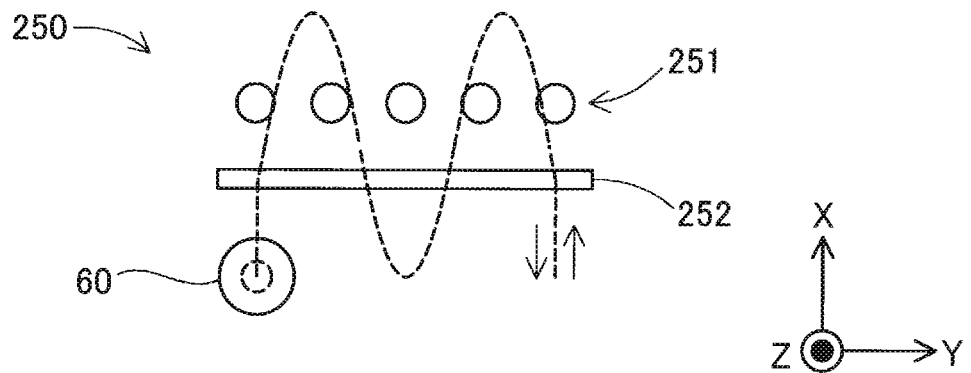
FIG. 12 is a diagram illustrating another example of the reciprocating operation of the nozzle.
Figure 13:
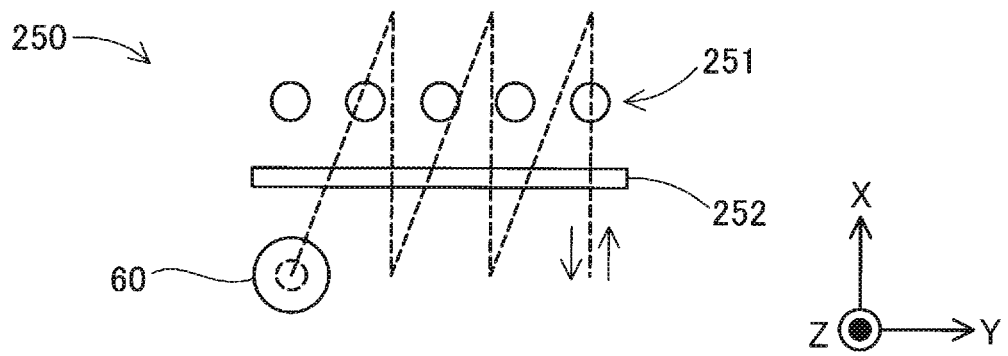
FIG. 13 is a diagram illustrating another example of the reciprocating operation of the nozzle.
Figure 14:
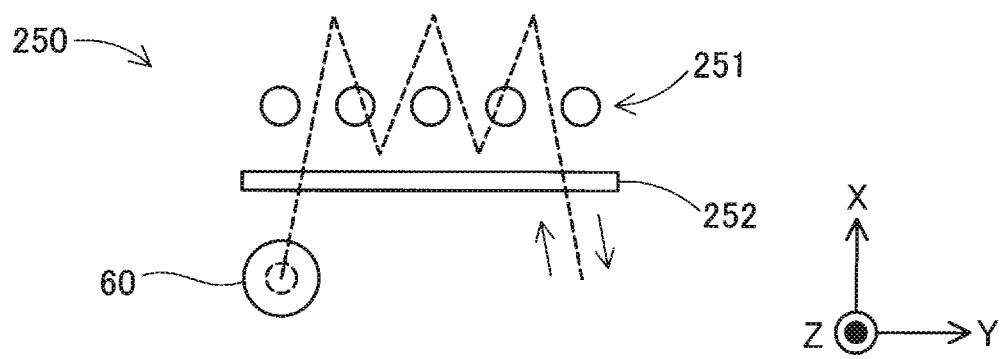
FIG. 14 is a diagram illustrating another example of the reciprocating operation of the nozzle.

FIGS. 11 to 14 are diagrams illustrating other examples of the reciprocating operation of the nozzle 60 in the cleaning processing. FIG. 11 shows an example in which the nozzle 60 is moved along a trajectory indicating a rectangular wave shape in the longitudinal direction of the cleaning mechanism 250. FIG. 12 shows an example in which the nozzle 60 is moved along a trajectory indicating a sine wave shape in the longitudinal direction of the cleaning mechanism 250. FIG. 13 shows an example in which the nozzle 60 is moved along a trajectory indicating a sawtooth wave shape in the longitudinal direction of the cleaning mechanism 250. As shown in these drawings, the control unit 300 can cause the nozzle 60 to reciprocate in various trajectories in the cleaning operation. As shown in FIG. 14, in the cleaning operation, the control unit 300 may set the number of times at which the nozzle 60 crosses the brush 251 to be larger than the number of times at which the nozzle 60 crosses the blade 252. In this manner, wearing of the blade 252 can be prevented.

In step S140 of the three-dimensional shaping processing shown in FIG. 8, the control unit 300 may determine a trajectory of the reciprocating operation of the nozzle 60 as shown in FIGS. 10 to 14 as the mode of the cleaning operation, in addition to or instead of the number of brushing times and the discharge amount. In this case, a trajectory of the reciprocating operation of the nozzle 60 corresponding to a cumulative ejection amount is defined in the cleaning condition table TB1 shown in FIG. 9. In this manner, the control unit 300 can determine the trajectory of the reciprocating operation of the nozzle 60 in accordance with the cumulative ejection amount.

B. Second Embodiment

In the first embodiment described above, the control unit 300 determines the mode of the cleaning operation based on the material information and the cumulative ejection amount included in the nozzle information shown in FIG. 6. On the other hand, in a second embodiment, the control unit 300 determines an execution timing of the cleaning processing based on the material information and the cumulative ejection amount. The configuration of the three-dimensional shaping device 10 according to the second embodiment is the same as the configuration of the three-dimensional shaping device 10 according to the first embodiment.

Figure 15:
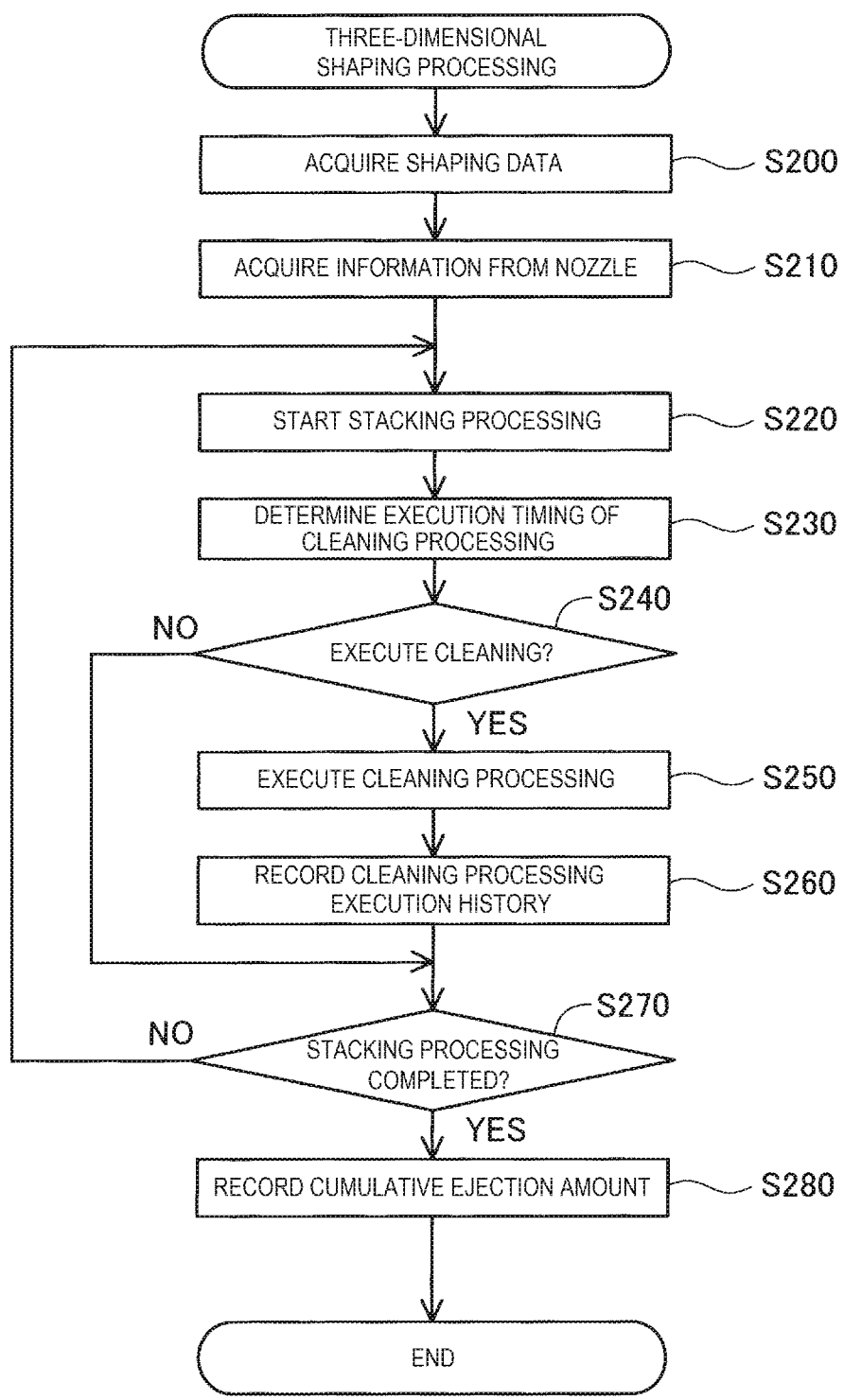
FIG. 15 is a flowchart showing a three-dimensional shaping processing according to a second embodiment.

FIG. 15 is a flowchart showing a three-dimensional shaping processing according to the second embodiment. In the three-dimensional shaping processing according to the second embodiment, the control unit 300 acquires the shaping data in step S200, and then acquires the nozzle information from the memory 66 of the nozzle 60 in step S210. Then, in step S220, the stacking processing is started. In the stacking processing, the control unit 300 updates a cumulative ejection amount by sequentially adding an ejection amount of the shaping material ejected from the nozzle 60 to a cumulative ejection amount acquired from the memory 66 of the nozzle 60 in step S210, and stores the cumulative ejection amount in the storage unit 320. Further, in the stacking processing, the control unit 300 according to the present embodiment sequentially adds an ejection amount from a previous cleaning processing up to a current ejection amount. This ejection amount is referred to as an inter-cleaning ejection amount.

During the execution of the stacking processing, in step S230, the control unit 300 determines an execution timing of the cleaning processing based on the nozzle information acquired from the memory 66 and a cleaning condition table stored in the storage unit 320.

Figures 16, 17:
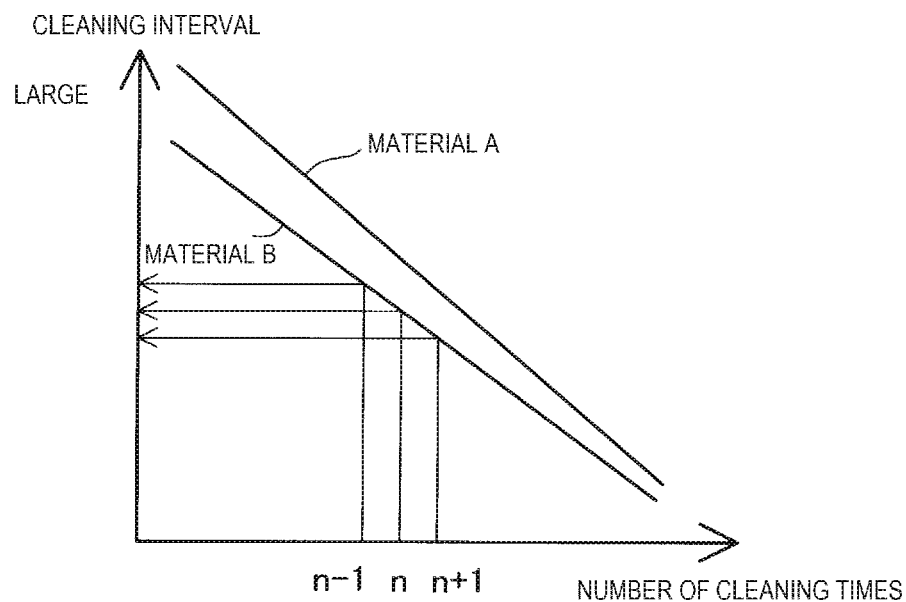
FIG. 16 is a diagram showing an example of a cleaning condition table.
FIG. 17 is a diagram showing a correspondence relationship between the number of cleaning times and a cleaning interval according to a third embodiment.

FIG. 16 is a diagram showing an example of a cleaning condition table TB2. In the cleaning condition table TB2 according to the second embodiment, a cumulative ejection amount and a cleaning frequency are associated with a type of a plasticizing material specified by the material information. The cleaning frequency is set to increase as the cumulative ejection amount increases. In the example shown in FIG. 16, for example, for a material A, when the cumulative ejection amount is up to 1000 g, the cleaning processing is executed every time 50 g of the shaping material is ejected, and when the cumulative ejection amount is 1000 g to 5000 g, the cleaning processing is executed every time 40 g of the shaping material is ejected. The cleaning frequency specified in this manner represents the execution timing of the cleaning processing.

In step S240, the control unit 300 determines whether a current timing is the execution timing of the cleaning processing determined in step S230 using the inter-cleaning ejection amount described above. For example, in a case where the shaping material is the material A and the cumulative ejection amount is up to 1000 g, when the inter-cleaning ejection amount is 50 g or more, it is determined that the current timing is the execution timing of the cleaning processing.

When it is determined that the current timing is the execution timing of the cleaning processing, the control unit 300 executes the cleaning processing in step S250. In the cleaning processing executed in the second embodiment, for example, the cleaning operation determined according to the nozzle information may be performed as described in the first embodiment. In addition, the cleaning operation may be performed in accordance with a predetermined number of brushing times, a discharge amount, and a movement trajectory of the nozzle. When the cleaning processing is completed, the control unit 300 resets the inter-cleaning ejection amount to zero. Then, in step S260, a cleaning execution history is recorded in the memory 66 provided in the nozzle 60.

After the cleaning execution history is recorded in step S260, or after it is determined in step S240 that the current timing is not the execution timing of the cleaning processing, the control unit 300 determines in step S270 whether the stacking processing is completed for all layers, that is, whether the shaping of the three-dimensional shaped object is completed. When the stacking processing is not completed, the control unit 300 returns the processing to step S220 and continues the stacking processing. When the stacking processing is completed, in step S280, the control unit 300 records the cumulative ejection amount sequentially integrated in the stacking processing and the cleaning processing in the memory 66 provided in the nozzle 60.

According to the three-dimensional shaping device 10 of the second embodiment described above, it is possible to manage the use of the nozzle 60 so as to avoid unexpected nozzle clogging, and it is possible to prevent a waste material adhering to the cleaning mechanism 250 from re-adhering to the nozzle 60 in a similar manner to the first embodiment.

In the present embodiment, the execution timing of the cleaning processing is determined based on the material information and the cumulative ejection amount included in the nozzle information. Therefore, for example, even when a state of deterioration or contamination of the nozzle 60 corresponding to the cumulative ejection amount differs in accordance with a material, it is possible to execute a cleaning processing at a timing suitable for the material.

In the present embodiment, the cleaning frequency increases as the cumulative ejection amount increases. The larger the cumulative ejection amount is, the more the deterioration or contamination of the nozzle progresses. Therefore, it is possible to prevent unexpected nozzle clogging of the nozzle and improve shaping quality by increasing the cleaning frequency as the cumulative ejection amount increases.

C. Third Embodiment

In the second embodiment described above, the cleaning frequency is determined in accordance with the material information and the cumulative ejection amount. On the other hand, in a third embodiment, the cleaning frequency is determined in accordance with the material information and the number of cleaning times. The configuration of the three-dimensional shaping device 10 according to the third embodiment is the same as the configuration of the three-dimensional shaping device 10 according to the first embodiment.

FIG. 17 is a diagram showing a correspondence relationship between the number of cleaning times and a cleaning interval. In the third embodiment, the same processing as the three-dimensional shaping processing according to the second embodiment shown in FIG. 15 is executed. In step S230 shown in FIG. 15, the control unit 300 determines the execution timing of the cleaning processing according to the correspondence relationship between the number of cleaning times and the cleaning interval as shown in FIG. 17, which is determined according to the material information. According to the correspondence relationship shown in FIG. 17, as the number of cleaning times increases to n−1 times, n times, and n+1 times, n being an integer of 2 or more, the cleaning interval decreases. That is, in the present embodiment, when the control unit 300 determines the execution timing of the cleaning processing for a plurality of times, the control unit 300 determines the cleaning interval such that an interval from the execution timing of an n-th cleaning processing to the execution timing of an (n+1)-th cleaning processing is shorter than an interval from the execution timing of an (n−1)-th cleaning processing to the execution timing of the n-th cleaning processing.

According to the third embodiment described above, as the number of execution times of the cleaning processing increases, the cleaning processing is executed at a shorter interval. Therefore, it is possible to prevent frequent occurrence of nozzle clogging due to the progress of deterioration or contamination of the nozzle 60, and it is possible to improve shaping quality.

D. Fourth Embodiment

In the first embodiment described above, the mode of the cleaning operation is determined according to the material information and the cumulative ejection amount. On the other hand, in a fourth embodiment, the mode of the cleaning operation is determined according to the material information and the number of cleaning times. The configuration of the three-dimensional shaping device 10 according to the fourth embodiment is the same as the configuration of the three-dimensional shaping device 10 according to the first embodiment.

Figure 18:
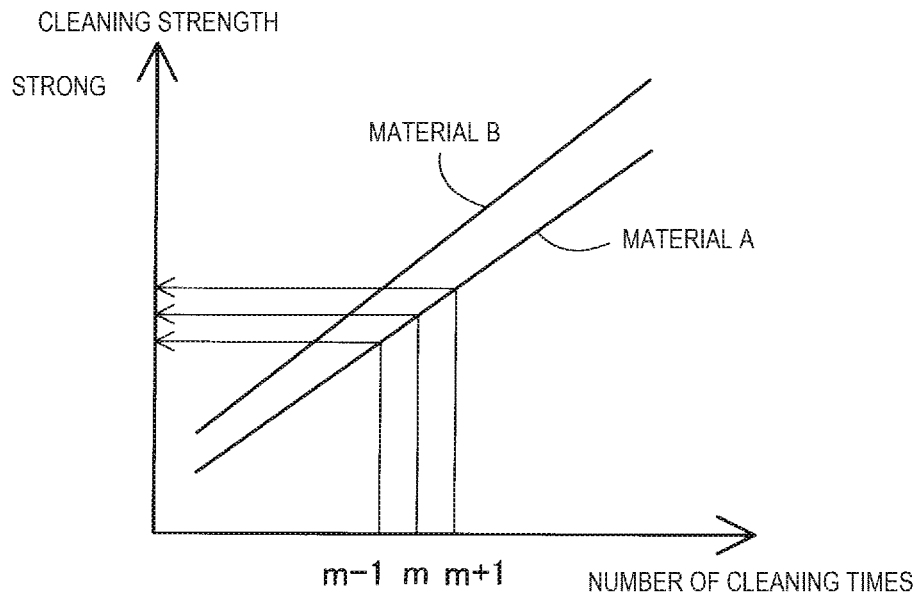
FIG. 18 is a diagram showing a correspondence relationship between the number of cleaning times and a cleaning strength according to a fourth embodiment.

FIG. 18 is a diagram showing a correspondence relationship between the number of cleaning times and a cleaning strength. In the fourth embodiment, the same processing as the three-dimensional shaping processing according to the first embodiment shown in FIG. 8 is executed. In step S140 shown in FIG. 8, the control unit 300 determines the mode of the cleaning operation according to the correspondence relationship between the number of cleaning times and the cleaning strength as shown in FIG. 18, which is determined according to the material information. According to the correspondence relationship shown in FIG. 18, as the number of cleaning times increases to m−1 times, m times, and m+1 times, m being an integer of 2 or more, the cleaning strength increases. That is, in the present embodiment, when the control unit 300 determines the execution timing of the cleaning processing for a plurality of times, the control unit 300 determines the cleaning strength such that a cleaning strength in an (m+1)-th cleaning processing is stronger than a cleaning strength in an m-th cleaning processing. In the present embodiment, the cleaning strength represents one of the number of brushing times and the discharge amount. For example, as the cleaning strength increases, the number of brushing times increases. As the cleaning strength increases, the discharge amount increases.

According to the fourth embodiment described above, as the number of execution times of the cleaning processing increases, the cleaning strength increases. Therefore, it is possible to prevent frequent occurrence of nozzle clogging due to the progress of deterioration or contamination of the nozzle 60, and it is possible to improve shaping quality.

The number of cleaning times in the third embodiment and the fourth embodiment described above may be the number of cleaning times in one three-dimensional shaping processing, or may be a cumulative number of cleaning times. When the number of cleaning times is the cumulative number of cleaning times, the number of cleaning times is recorded as nozzle information in the memory 66 provided in the nozzle 60. In this manner, it is possible to manage the cumulative number of cleaning times for each nozzle 60.

E. Fifth Embodiment

In the second embodiment described above, the cleaning processing of the nozzle 60 is executed at a cleaning timing corresponding to the cleaning frequency determined according to the material information and the cumulative ejection amount. On the other hand, in a fifth embodiment, a processing of changing a cleaning timing once determined is executed.

Figure 19:
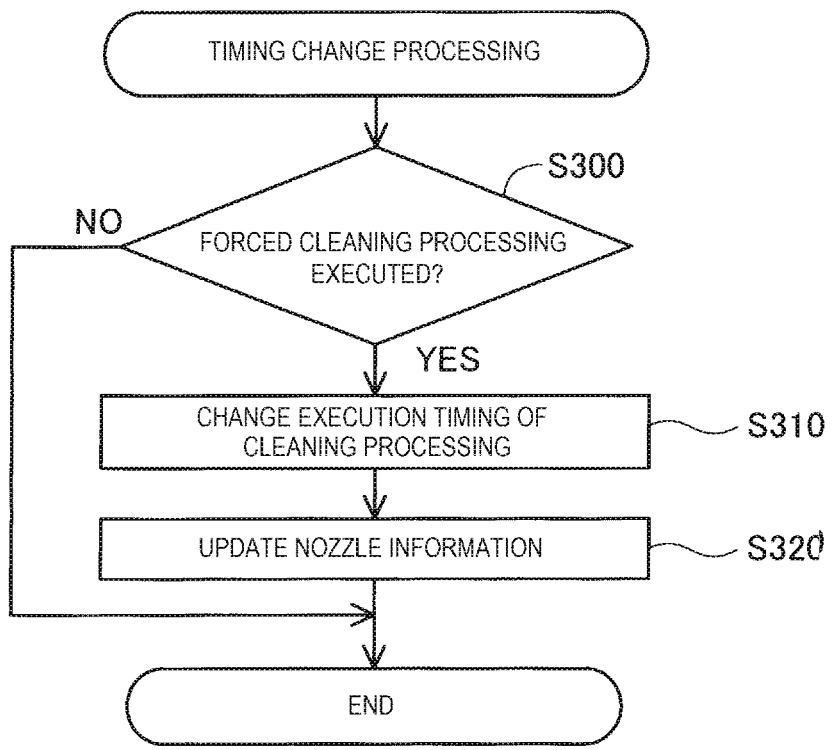
FIG. 19 is a flowchart showing a timing change processing according to a fifth embodiment.

FIG. 19 is a flowchart showing a timing change processing executed in the fifth embodiment. The timing change processing is simultaneously executed in parallel by the control unit 300 while the three-dimensional shaping processing in the second embodiment shown in FIG. 15 is executed.

In step S300, the control unit 300 determines whether a forced cleaning processing is executed. In the present embodiment, it is assumed that the cleaning processing is forcibly executed when the plasticizing material is changed. In the forced cleaning processing, the shaping material remaining in the plasticizing mechanism 30 is discharged as a waste material, and a reciprocating operation of the nozzle 60 for removing the shaping material adhering to the nozzle 60 is performed.

When it is determined that the forced cleaning processing is executed, the control unit 300 changes the execution timing of the cleaning processing in step S310. Specifically, the inter-cleaning ejection amount used to determine whether it is the execution timing of the cleaning processing in step S240 shown in FIG. 15 is reset to zero. For example, when the inter-cleaning ejection amount is calculated to be 30 g in the stacking processing so far, a value of the inter-cleaning ejection amount is set to zero. Then, in step S320, the control unit 300 records a type of the changed plasticizing material in the memory 66 provided in the nozzle 60, and updates the nozzle information in the memory 66. When it is determined in step S300 that the shaping material is not changed, the control unit 300 skips the processings in step S310 and step S320 described above.

According to the fifth embodiment described above, when the plasticizing material is changed and the forced cleaning processing is executed, the execution timing of the cleaning processing is changed. Accordingly, when a period from an execution timing of a p-th cleaning processing to an execution timing of a (p+1)-th cleaning processing is shorter than a period determined based on the cumulative ejection amount, p being an integer of 1 or more, the control unit 300 can change and delay a start timing of the (p+1)-th cleaning processing. Therefore, it is possible to prevent a subsequent cleaning processing from being executed immediately after the forced cleaning processing, and it is possible to prevent the cleaning processing from being executed excessively.

The forced cleaning processing is not limited to being executed when the plasticizing material is changed. For example, the forced cleaning processing may be executed when a user manually instructs to execute the cleaning processing at any timing.

In the present embodiment, an execution timing of a cleaning processing to be executed next time is changed by resetting the inter-cleaning ejection amount to zero. On the other hand, for example, in step S310, the control unit 300 may determine to cancel the cleaning processing to be executed next time, that is, not to execute the (p+1)-th cleaning processing. In this manner, it is also possible to prevent the cleaning processing from being executed excessively.

In the fifth embodiment, when it is determined in step S300 shown in FIG. 19 that the forced cleaning processing is executed, the control unit 300 changes the execution timing of the cleaning processing. On the other hand, in another embodiment, for example, when it is determined in step S300 that the forced cleaning processing is executed, the control unit 300 may change the mode of the cleaning operation such as the number of brushing times and the discharge amount in step S310.

F. Sixth Embodiment

Figure 20:
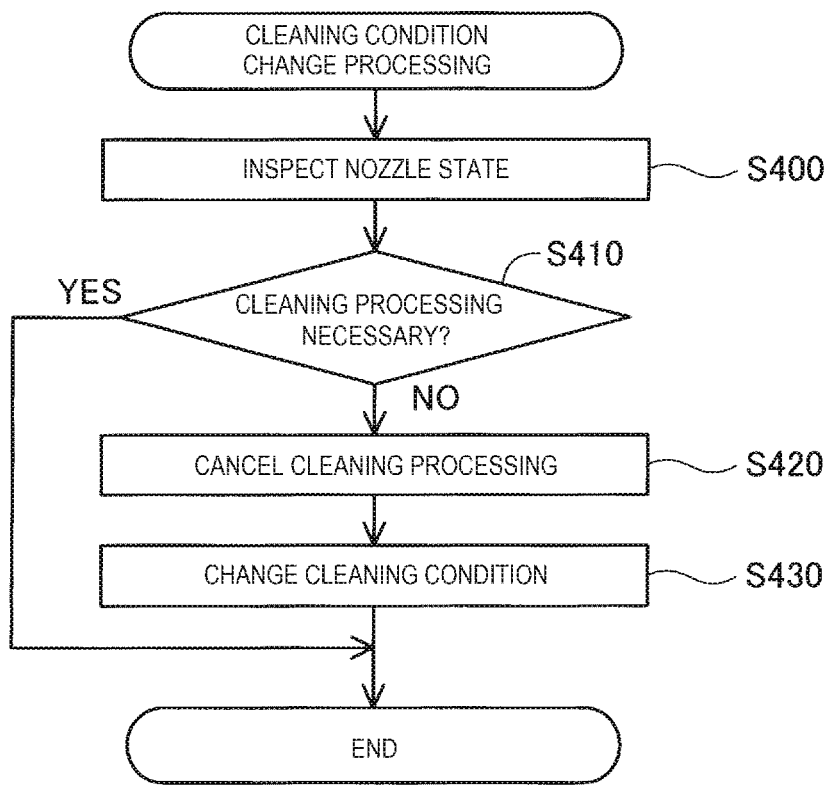
FIG. 20 is a flowchart showing a cleaning condition change processing according to a sixth embodiment.

FIG. 20 is a flowchart showing a cleaning condition change processing executed by the control unit 300 according to a sixth embodiment. The cleaning condition change processing is executed before the execution of the cleaning processing in step S150 in the three-dimensional shaping processing according to the first embodiment shown in FIG. 8 or the cleaning processing in step S250 in the three-dimensional shaping processing according to the second embodiment shown in FIG. 15.

In step S400, the control unit 300 inspects a state of the nozzle 60. For example, the control unit 300 causes a camera provided in the three-dimensional shaping device 10 to capture an image of the nozzle 60, and inspects whether a material adheres to the nozzle 60 based on the captured image. For example, the control unit 300 may inspect whether ejection from the nozzle 60 is normally performed by measuring whether a specified amount of the shaping material is ejected using a weight sensor or the like.

In step S410, the control unit 300 determines whether a current cleaning processing is necessary according to an inspection result of the nozzle 60 in step S400. In a case where an amount of the shaping material adhering to the nozzle 60 is smaller than a predetermined amount or in a case where a predetermined amount or more of the shaping material is ejected from the nozzle 60, the control unit 300 determines that the cleaning processing is not necessary, and in step S420, the control unit 300 cancels the cleaning processing scheduled to be executed immediately after the execution of the cleaning condition change processing.

After the cleaning processing is cancelled, the control unit 300 changes a cleaning condition in step S430. Specifically, for example, a value of the cumulative ejection amount in the cleaning condition table TB1 shown in FIG. 9 used in the first embodiment is updated and increased to change a cleaning condition in a manner in which the number of brushing times or the discharge amount is increased slowly. For example, the value of the cumulative ejection amount or the cleaning frequency in the cleaning condition table TB2 shown in FIG. 16 used in the second embodiment is updated and increased to change a cleaning condition in a manner in which a cleaning interval is increased.

When it is determined in step S410 that the cleaning processing is necessary, the control unit 300 skips the processings in step S420 and step S430.

When the cleaning condition change processing described above ends, the cleaning processing and the stacking processing are continued in accordance with the three-dimensional shaping processing in the first embodiment or the second embodiment.

According to the sixth embodiment described above, it is possible to cancel the cleaning processing according to the inspection result of the nozzle 60. Accordingly, when the cleaning processing is executed in accordance with an execution timing of an r-th cleaning processing that has been already determined, r being an integer of 1 or more, the state of the nozzle 60 is inspected before the execution of the cleaning processing, and the mode of cleaning operations of the r-th cleaning processing and subsequent cleaning processings or the execution timing of the cleaning processing can be changed based on the inspection result. Therefore, it is possible to prevent the cleaning from being performed in a situation in which the cleaning processing of the nozzle 60 is not necessary, and thus it is possible to prevent the cleaning processing from being executed excessively.

Although the control unit 300 updates the value in the cleaning condition table in step S430 shown in FIG. 20 in the present embodiment, this processing may be omitted. That is, the control unit 300 may only cancel the cleaning processing scheduled to be executed immediately thereafter.

G. Seventh Embodiment

Figure 21:
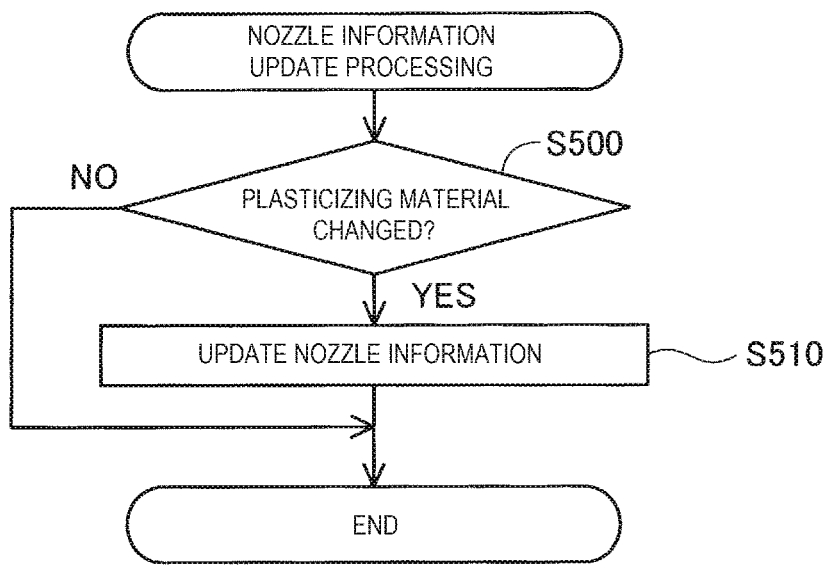
FIG. 21 is a flowchart showing a nozzle information update processing according to a seventh embodiment.

FIG. 21 is a flowchart showing a nozzle information update processing executed by the control unit 300 according to a seventh embodiment. The nozzle information update processing is executed before the execution of the three-dimensional shaping processing according to the first embodiment or the three-dimensional shaping processing according to the second embodiment described above.

In step S500, the control unit 300 determines whether the plasticizing material is changed. For example, the control unit 300 determines that the plasticizing material is changed when a predetermined operation for changing the plasticizing material is received from a user.

When it is determined in step S500 that the plasticizing material is changed, the control unit 300 updates the nozzle information in step S510. Specifically, the material information recorded in the memory 66 of the nozzle 60 is rewritten to information indicating the changed plasticized material. Further, a value of the cumulative ejection amount recorded in the memory 66 and the storage unit 320 is converted into a value corresponding to the changed plasticizing material and is rewritten. For example, in a case where the plasticizing material is changed from a material A to a material B, when the material B is a material for which the deterioration of the nozzle 60 progresses twice of the material A, the cumulative ejection amount recorded in the memory 66 so far is rewritten to a value of ½ of the value before the update.

When it is determined in step S500 that the plasticizing material is not changed, the control unit 300 skips the processing in step S510.

According to the seventh embodiment described above, since the nozzle information is updated when the plasticizing material is changed, the mode of the cleaning operation and the execution timing of the cleaning processing can be determined according to the updated nozzle information in the three-dimensional shaping processing according to the first embodiment or the three-dimensional shaping processing according to the second embodiment. Therefore, even when the plasticizing material is changed, the cleaning processing can be executed using a cleaning operation or at an execution timing suitable for the changed plasticizing material.

Although the value of the cumulative ejection amount recorded in the memory 66 and the storage unit 320 is rewritten to a value corresponding to the changed plasticizing material when the nozzle information is updated in the present embodiment, this processing may be omitted. For example, a history of the plasticizing material ejected from the nozzle 60 so far may be recorded in the memory 66 of the nozzle 60 in association with the cleaning processing execution history. The control unit 300 may convert the cumulative ejection amount according to the history, and determine the mode of the cleaning operation and the execution timing of the cleaning processing based on the converted value.

H. Eighth Embodiment

Figure 22:
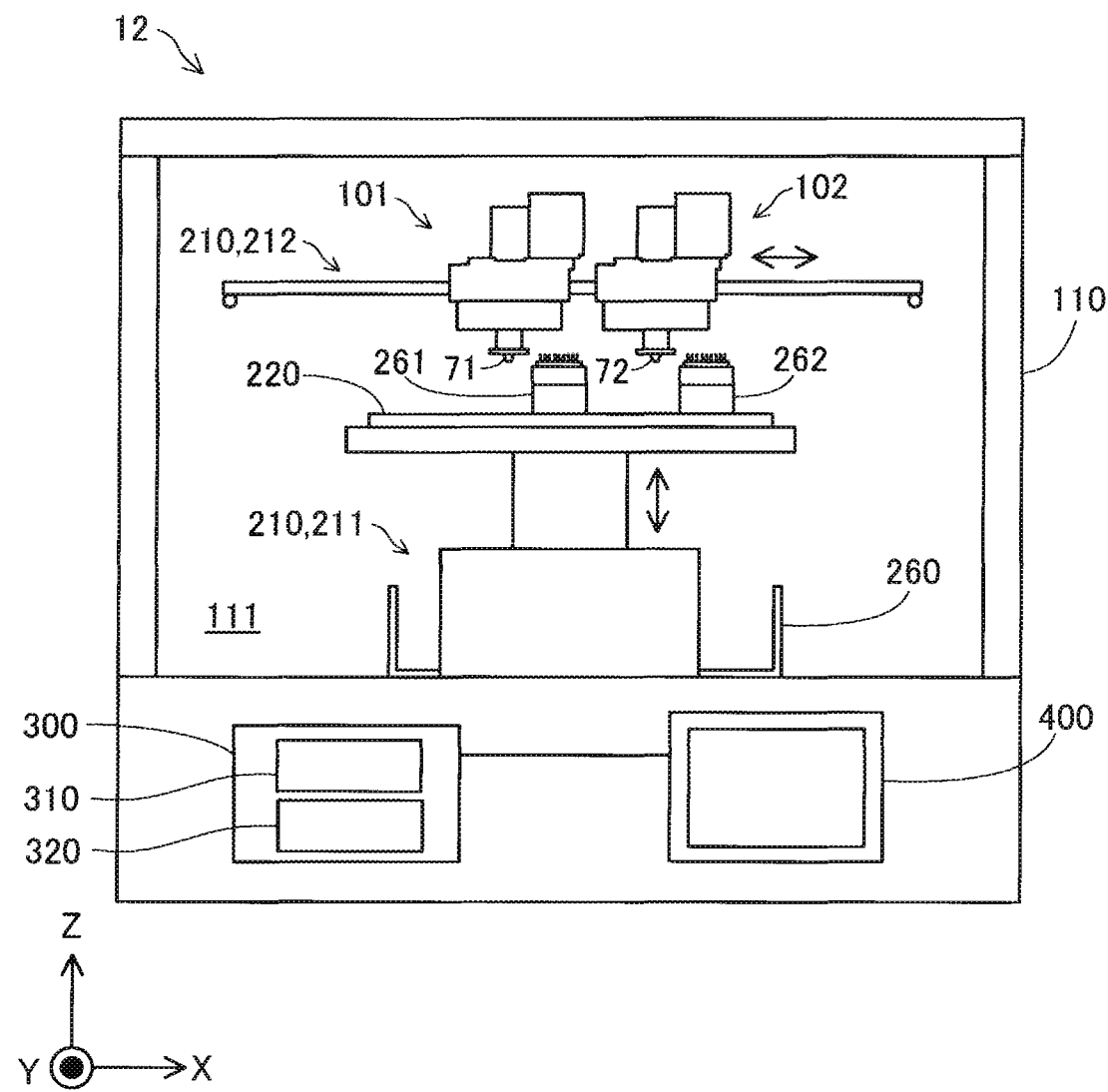
FIG. 22 is a diagram showing a schematic configuration of a three-dimensional shaping device according to an eighth embodiment.

FIG. 22 is a diagram showing a schematic configuration of a three-dimensional shaping device 12 according to an eighth embodiment. In the eighth embodiment, the three-dimensional shaping device 12 includes two ejection units and two cleaning mechanisms. Specifically, the ejection unit in the present embodiment includes a first ejection unit 101 provided with a first nozzle 71 that ejects a first shaping material, and a second ejection unit 102 provided with a second nozzle 72 that ejects a second shaping material. Each of the first nozzle 71 and the second nozzle 72 is provided with a memory, and the nozzle information shown in FIG. 6 is recorded for each nozzle. The first shaping material and the second shaping material may be, for example, a combination of a shaping material and a support material, and may also be, for example, a combination of materials of different colors or a combination of different materials. The configurations of the first ejection unit 101 and the second ejection unit 102 are the same as the configuration of the ejection unit 100 according to the first embodiment.

The cleaning mechanism in the present embodiment includes a first cleaning mechanism 261 provided with a brush and a blade for cleaning the first nozzle 71, and a second cleaning mechanism 262 provided with a brush and a blade for cleaning the second nozzle 72. The configurations of the first cleaning mechanism 261 and the second cleaning mechanism 262 are the same as the configuration of the cleaning mechanism 250 according to the first embodiment. In the present embodiment, the two cleaning mechanisms 261 and 262 are arranged at a predetermined interval in the X direction, and a purge unit, the blade, and the brush provided in each of the cleaning mechanisms 261 and 262 are arranged in this order in the −Y direction. In the present embodiment, a longitudinal direction of the first cleaning mechanism 261 and the second cleaning mechanism 262 is the X direction.

In the present embodiment, the control unit 300 executes the three-dimensional shaping processing according to any one of the above-described embodiments by using the two ejection units 101 and 102 and the two cleaning mechanisms 261 and 262. In the three-dimensional shaping processing according to the present embodiment, the stacking processing is executed by using the two ejection units 101 and 102. In the cleaning processing, the control unit 300 performs the cleaning operation as shown in FIG. 10 on the first nozzle 71 provided in the first ejection unit 101 and the second nozzle 72 provided in the second ejection unit 102, thereby cleaning the first nozzle 71 and the second nozzle 72 using the first cleaning mechanism 261 and the second cleaning mechanism 262.

According to the eighth embodiment described above, since the memory is provided in each of the nozzles 71 and 72 provided in the two ejection units 101 and 102, it is possible to manage the nozzle information for each nozzle. As a result, the cleaning processing can be executed in a mode of a cleaning operation or at an execution timing corresponding to materials in the two nozzles 71 and 72. Although an example in which the three-dimensional shaping device 12 includes two ejection units is described in the present embodiment, the three-dimensional shaping device 12 may include three or more ejection units. In addition, one cleaning mechanism may be used in common for a plurality of ejection units.

I. Ninth Embodiment

Figure 23:
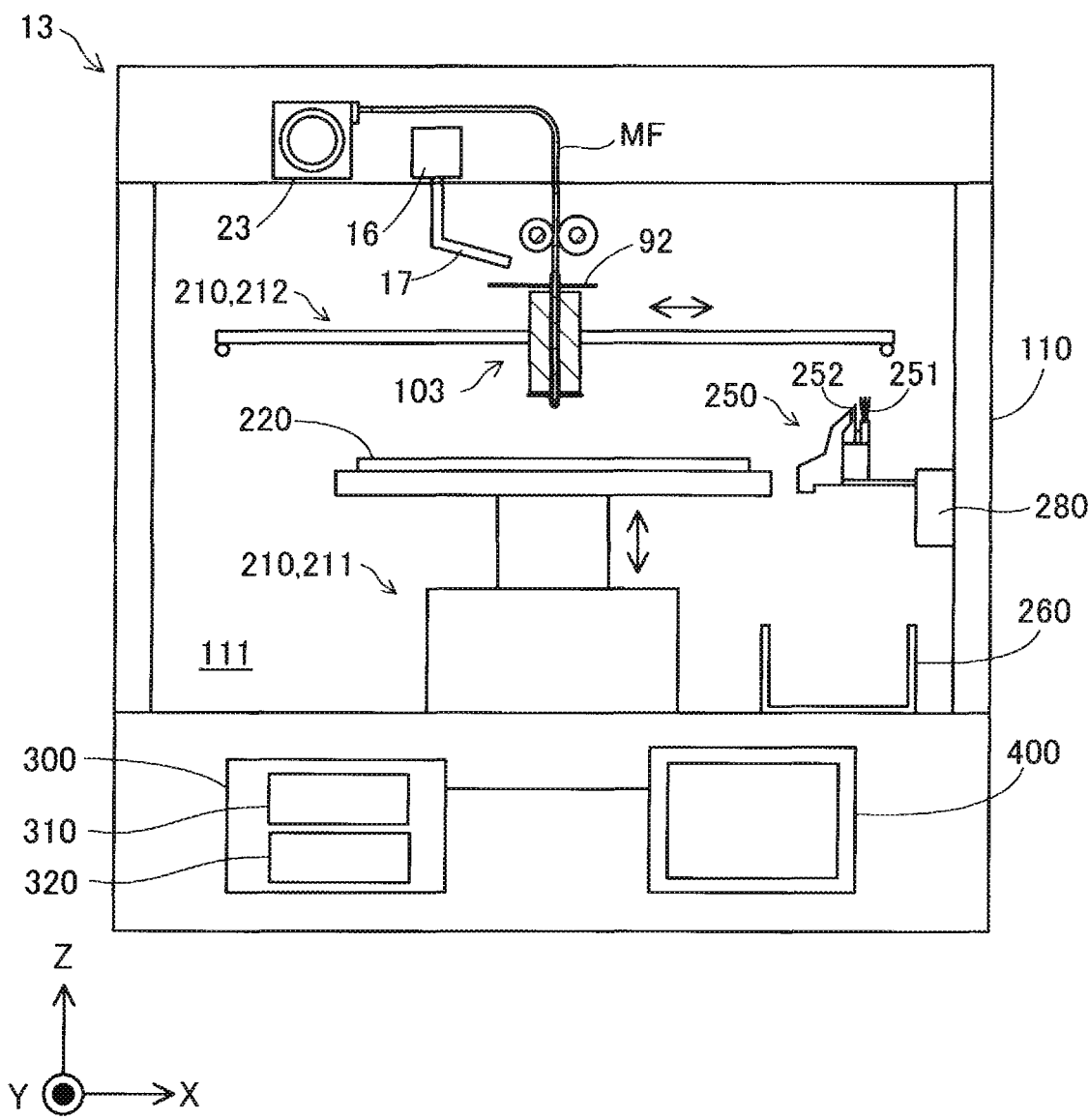
FIG. 23 is a diagram showing a schematic configuration of a three-dimensional shaping device according to a ninth embodiment.

FIG. 23 is a diagram showing a schematic configuration of a three-dimensional shaping device 13 according to a ninth embodiment. The three-dimensional shaping device 13 according to the ninth embodiment is different from the three-dimensional shaping processing according to the first embodiment mainly in the configuration of the ejection unit, and the other configurations and processing contents of the three-dimensional shaping processing are the same as those according to the first to seventh embodiments. Therefore, the configuration of the ejection unit will be mainly described below.

The three-dimensional shaping device 13 according to the present embodiment includes an ejection unit 103, a material storage unit 23, the housing 110, the drive unit 210, the stage 220, and the control unit 300. The three-dimensional shaping device 13 further includes a blower 16. The blower 16 is a blower that blows air toward the ejection unit 103 through a manifold 17. In the present embodiment, a portion of the manifold 17, the ejection unit 103, the drive unit 210, and the stage 220 are accommodated in the shaping space 111 in the housing 110.

The material storage unit 23 according to the present embodiment is implemented as a holder that stores a filament-like material. The material storage unit 23 can wind out a material stored in the material storage unit 23 to the outside.

Figure 24:
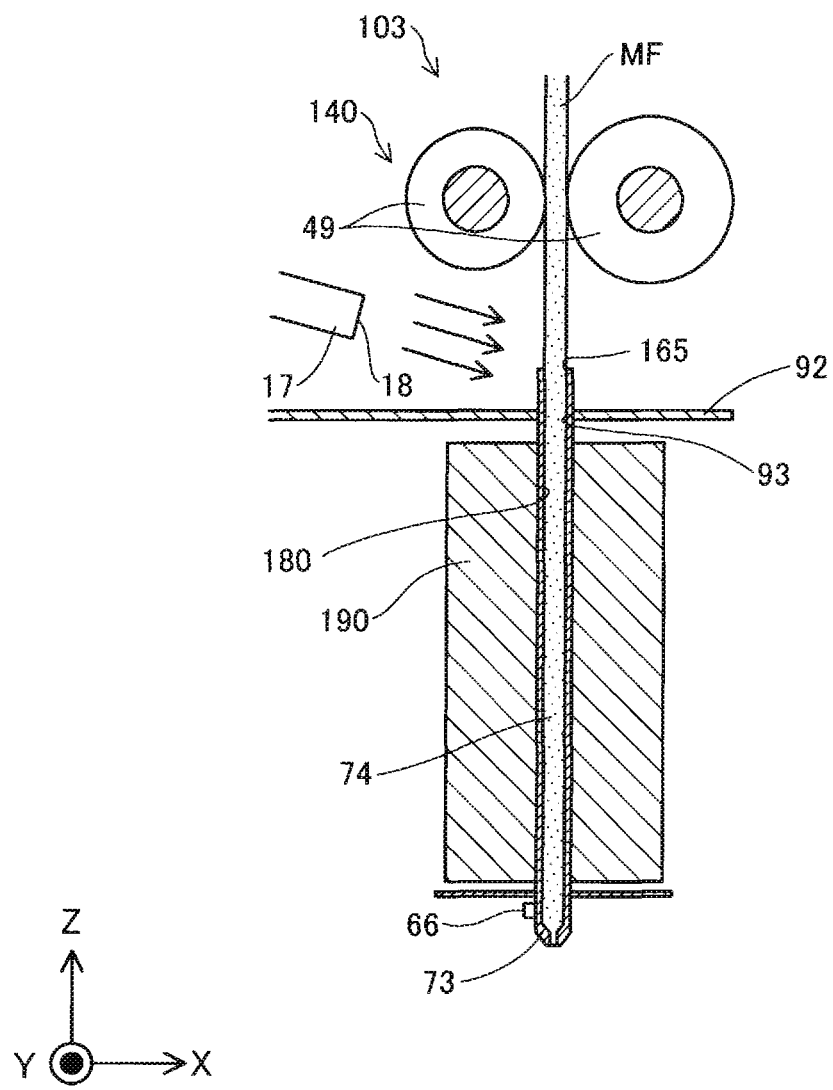
FIG. 24 is a diagram showing a schematic configuration of an ejection unit according to the ninth embodiment.

FIG. 24 is a diagram showing a schematic configuration of the ejection unit 103 according to the present embodiment. The ejection unit 103 includes a heating block 190 serving as a plasticizing mechanism that has a heater and is provided with a through hole 180, a nozzle 73 detachably attached to the through hole 180, and a material conveying mechanism 140 that conveys a material MF toward a nozzle flow path 74 of the nozzle 73 attached to the heating block 190. The ejection unit 103 further includes a shield 92 that is disposed between the material conveying mechanism 140 and the heating block 190 in the Z direction and prevents heat transfer from the heating block 190 to the material conveying mechanism 140. Different from the first embodiment, the material conveying mechanism 140 according to the present embodiment does not include the screw case 31 and the screw 41 and includes two wheels 49. Different from the first embodiment, the heating block 190 does not include the barrel 50 and the case portion 91.

The nozzle 73 according to the present embodiment is attached to the heating block 190 by being inserted into the through hole 180 and a shield opening 93 provided in the shield 92 from the −Z direction. In the present embodiment, a dimension of the nozzle 73 along the Z direction and a dimension of the nozzle flow path 74 along the Z direction are longer than a dimension of the through hole 180 along the Z direction. In the present embodiment, an inflow port 165 provided at a rear end of the nozzle 73 is located at the +Z direction side of the heating block 190, more specifically, at the +Z direction side of the shield 92.

Similar to the first embodiment, the nozzle 73 includes the shield 92. Similar to the first embodiment, the nozzle 73 includes the memory 66. Similar to the first embodiment, the memory 66 functions as a nozzle information storage unit, and stores the nozzle information. Similar to the first embodiment, the memory 66 is located between a nozzle opening 63C and a shield 68C in the Z direction.

The two wheels 49 constituting the material conveying mechanism 140 draws out the material MF in the material storage unit 23 to the outside, guides the material MF toward a space between the two wheels 49 by the rotation, and conveys the material MF toward the nozzle flow path 74 of the nozzle 73 attached to the through hole 180 of the heating block 190. The heating block 190 plasticizes the material MF conveyed into the nozzle flow path 74 of the nozzle 73 using heat of a heater (not shown) built in the heating block 190.

The material MF according to the present embodiment is cooled near the inflow port 165 of the nozzle 73 by air sent from the blower 16 described above through the manifold 17. As a result, plasticization of the material MF in the vicinity of the inflow port 165 is prevented, and the material MF is efficiently conveyed into the inflow port 165. An outlet end 18 of the manifold 17 is located at the +Z direction side of the shield 92. As a result, the air sent out from the manifold 17 is easily guided to the vicinity of the inflow port 165 by the shield 92, and thus the material MF in the vicinity of the inflow port 165 is efficiently cooled.

Although the configuration of the cleaning mechanism 250 according to the present embodiment is the same as that in the first embodiment, the tip end of the brush 251 does not come into contact with the shield 92 during the cleaning processing. This is because the shield 92 is located above the heating block 190 in the present embodiment.

In the three-dimensional shaping device 13 according to the present embodiment described above as well, it is also possible to clean the nozzle 73 using the cleaning mechanism 250. In addition, since the nozzle 73 is provided with the memory 66, it is possible to manage the use of the nozzle 73.

J. Other Embodiments (J1) In the embodiments described above, the nozzle identification information, the material information, the cleaning processing execution history, the cumulative ejection amount, and the nozzle use time are recorded as the nozzle information in the memory 66 provided in the nozzle 60. Alternatively, the nozzle information may be stored in the storage unit 320 provided in the control unit 300, and only the nozzle identification information may be recorded in the memory 66. The control unit 300 can manage the nozzle information for each nozzle 60 by collating the nozzle identification information recorded in the memory 66 of the nozzle 60 with the nozzle identification information stored in the storage unit 320.

Instead of the storage unit 320 provided in the control unit 300, the nozzle information may be stored in a predetermined server device coupled to the three-dimensional shaping device 10 via a communication line such as the Internet. The control unit 300 can collate the nozzle identification information stored in the memory 66 of the nozzle 60 with the nozzle identification information included in the nozzle information stored in the server device, and can acquire the nozzle information of the nozzle 60 attached to the three-dimensional shaping device from the server device.

A plurality of three-dimensional shaping devices may be coupled to the server device. In this manner, the server device centrally manages nozzle information of the nozzles 60 used in the plurality of three-dimensional shaping devices. As a result, for example, even when a nozzle 60 used in another three-dimensional shaping device is attached to the three-dimensional shaping device and used, the nozzle information corresponding to the nozzle 60 can be acquired from the server device, and thus the use of the nozzle 60 can be easily managed.

Not only the nozzle information but also the cleaning condition table TB1 shown in FIG. 9 and the cleaning condition table TB2 shown in FIG. 16 may be stored in the server device. In this manner, the control unit of each three-dimensional shaping device can determine the mode of the cleaning operation and the execution timing of the cleaning processing with reference to the cleaning condition table centrally managed in the server device.

(J2) In the first embodiment and the second embodiment described above, the control unit 300 compares the cumulative ejection amount recorded in the memory 66 of the nozzle 60 with the cumulative ejection amount defined in the cleaning condition table TB1 or the cleaning condition table TB2, and determines the mode of the cleaning operation and the execution timing of the cleaning processing. On the other hand, the control unit 300 may determine the mode of the cleaning operation and the execution timing of the cleaning processing by using the nozzle use time recorded in the memory 66. In this case, the nozzle use time and the mode of the cleaning operation or the execution timing of the cleaning processing are associated with each other in the cleaning condition table TB1 and the cleaning condition table TB2.

(J3) In the first embodiment and the second embodiment described above, the control unit 300 determines the mode of the cleaning operation or the execution timing of the cleaning processing based on the material information and the cumulative ejection amount in the nozzle information.

On the other hand, the control unit 300 may determine the mode of the cleaning operation or the execution timing of the cleaning processing based on only one of the material information, the cumulative ejection amount, and the nozzle use time.

(J4) In the embodiments described above, the control unit 300 moves the nozzle 60 from the blade 252 side to the brush 251 side at the start of the cleaning operation. On the other hand, the control unit 300 may move the nozzle 60 from the brush 251 side to the blade 252 side at the start of the cleaning operation.

(J5) In the embodiments described above, the cleaning mechanism 250 includes the purge unit 253. On the other hand, the cleaning mechanism 250 may not include the purge unit 253.

(J6) In the embodiments described above, the nozzles 60 and 73 include the shields 68 and 92, respectively. On the other hand, the nozzles 60 and 73 may not include the shields 68 and 92, respectively.

(J7) In the embodiments described above, the cleaning mechanism 250 is disposed in a region different from the stage 220 in the horizontal direction. On the other hand, the cleaning mechanism 250 may be disposed in a region that overlaps the stage 220 in the horizontal direction and that is different from a shaping region of the stage 220 in which the three-dimensional shaped object is shaped. Accordingly, it is possible to provide a compact three-dimensional shaping device.

K. Other Aspects

The present disclosure is not limited to the embodiments described above, and can be implemented in various forms without departing from the scope of the present disclosure. In order to solve a part of or all of the above problems, or to achieve a part of or all of the above effects, technical features in the embodiments described above corresponding to technical features described in the following aspects can be replaced or combined as appropriate. For example, various embodiments described above can be combined as appropriate. Technical features can be deleted as appropriate unless described as essential in the present specification.

(1) According to a first aspect of the present disclosure, there is provided a three-dimensional shaping device. The three-dimensional shaping device includes an ejection unit that is provided with a nozzle and a plasticizing mechanism configured to plasticize a plasticizing material to generate a shaping material and that is configured to eject the shaping material from the nozzle; a stage on which the shaping material is stacked; a drive unit configured to change a relative position between the ejection unit and the stage; a cleaning mechanism that is provided with a brush and a blade; and a control unit configured to execute a cleaning processing of cleaning the nozzle and control the ejection unit and the drive unit to stack a layer on the stage, in which the brush and the blade are disposed at a height at which the brush and the blade are contactable with the nozzle, the brush and the blade have a melting point higher than a plasticizing temperature of the plasticizing material and a hardness lower than a hardness of the nozzle, the control unit executes a cleaning operation of bringing at least one of the brush and the blade into contact with the nozzle by causing the nozzle to reciprocate in a manner in which the nozzle crosses the cleaning mechanism for a plurality of times in the cleaning processing, the control unit causes the nozzle to reciprocate such that the nozzle comes into contact with the brush or the blade at different positions in the cleaning operation, and the control unit records at least one of material information on a type of the plasticizing material, a cumulative ejection amount of the shaping material ejected from the nozzle, and a use time of the nozzle in association with the nozzle.

According to such an aspect, since the control unit records the nozzle in association with at least one of the material information on the type of the plasticizing material, the cumulative ejection amount of the shaping material, and the use time of the nozzle, it is possible to manage the use of the nozzle so as to avoid unexpected nozzle clogging. Since the control unit causes the nozzle to reciprocate such that the nozzle comes into contact with the brush or the blade at different positions in the cleaning operation, it is possible to prevent a waste material adhering to the cleaning mechanism from re-adhering to the nozzle during the cleaning processing.

(2) In the above aspect, the control unit may determine a mode of the cleaning operation or an execution timing of the cleaning processing based on at least one of the material information, the cumulative ejection amount, and the use time of the nozzle. According to such an aspect, the mode of the cleaning operation and the execution timing of the cleaning processing can be changed according to the material information, the cumulative ejection amount, and the use time of the nozzle.

(3) In the above aspect, the control unit may determine the execution timing of the cleaning processing for a plurality of times, and an interval from an execution timing of an n-th cleaning processing to an execution timing of an (n+1)-th cleaning processing may be shorter than an interval from an execution timing of an (n−1)-th cleaning processing to the execution timing of an n-th cleaning processing, n being an integer of 2 or more. According to such an aspect, since the cleaning processing is executed at a shorter interval as the number of execution times of the cleaning processing increases, it is possible to prevent frequent occurrence of nozzle clogging due to the progress of deterioration or contamination of the nozzle. Therefore, shaping quality can be improved.

(4) In the above aspect, the control unit may determine the execution timing of the cleaning processing for a plurality of times, and a cleaning strength in an (m+1)-th cleaning processing may be stronger than a cleaning strength in an m-th cleaning processing, m being an integer of 1 or more. According to such an aspect, since the cleaning strength becomes stronger as the number of execution times of the cleaning processing increases, it is possible to prevent frequent occurrence of nozzle clogging due to the progress of deterioration or contamination of the nozzle. Therefore, shaping quality can be improved.

(5) In the above aspect, when a period from an execution timing of a p-th cleaning processing to an execution timing of a (p+1)-th cleaning processing is shorter than a period determined based on the cumulative ejection amount or the use time of the nozzle, p being an integer of 1 or more, the control unit may not execute the (p+1)-th cleaning processing or may change a start timing of the (p+1)-th cleaning processing. According to such an aspect, it is possible to prevent the cleaning processing from being excessively executed.

(6) In the above aspect, when the cleaning processing is executed according to a determined execution timing of an r-th cleaning processing, r being an integer of 1 or more, the control unit may inspect a state of the nozzle before the execution of the cleaning processing, and may change a mode of cleaning operations of the r-th cleaning processing and a subsequent cleaning processing or the execution timing of the cleaning processing based on an inspection result. According to such an aspect, it is possible to prevent the cleaning processing from being excessively executed.

(7) In the above aspect, when the plasticizing material is changed, the control unit may change the execution timing of the cleaning processing or the mode of the cleaning operation. According to such an aspect, the cleaning processing can be executed in accordance with the changed plasticizing material.

(8) In the above aspect, when the cleaning processing is executed, the control unit may record a cleaning processing execution history in association with the cumulative ejection amount or the use time of the nozzle.

(9) According to a second aspect of the present disclosure, there is provided a method for manufacturing a three-dimensional shaped object in a three-dimensional shaping device. The three-dimensional shaping device includes: an ejection unit that is provided with a nozzle and a plasticizing mechanism configured to plasticize a plasticizing material to generate a shaping material and that is configured to eject the shaping material from the nozzle; a stage on which the shaping material is stacked; a drive unit configured to change a relative position between the ejection unit and the stage; and a cleaning mechanism provided with a brush and a blade, in which the brush and the blade are disposed at a height at which the brush and the blade are contactable with the nozzle, and the brush and the blade have a melting point higher than a plasticizing temperature of the plasticizing material and a hardness lower than a hardness of the nozzle. The manufacturing method includes: a stacking step of stacking a layer on the stage by controlling the ejection unit and the drive unit; a cleaning step of executing a cleaning operation of bringing at least one of the brush and the blade into contact with the nozzle by causing the nozzle to reciprocate in a manner in which the nozzle crosses the cleaning mechanism for a plurality of times, in which in the cleaning step, the nozzle reciprocates such that the nozzle comes into contact with the brush or the blade at different positions in the cleaning operation, and at least one of material information on a type of the plasticizing material, a cumulative ejection amount of the shaping material ejected from the nozzle, and a use time of the nozzle is recorded in association with the nozzle.

What is claimed is:
1. A three-dimensional shaping device comprising:
an ejection unit that is provided with a nozzle and a plasticizing mechanism configured to plasticize a plasticizing material to generate a shaping material and that is configured to eject the shaping material from the nozzle;
a stage on which the shaping material is stacked;
a drive unit configured to change a relative position between the ejection unit and the stage;
a cleaning mechanism provided with a brush and a blade; and
a control unit configured to execute a cleaning processing of cleaning the nozzle and control the ejection unit and the drive unit to stack a layer on the stage, wherein
the brush and the blade are disposed at a height at which the brush and the blade are contactable with the nozzle,
the brush and the blade have a melting point higher than a plasticizing temperature of the plasticizing material and a hardness lower than a hardness of the nozzle,
the control unit executes a cleaning operation of bringing at least one of the brush and the blade into contact with the nozzle by causing the nozzle to reciprocate in a manner in which the nozzle crosses the cleaning mechanism for a plurality of times in the cleaning processing, the control unit causes the nozzle to reciprocate such that the nozzle comes into contact with the brush or the blade at different positions in the cleaning operation, the control unit records at least one of material information on a type of the plasticizing material, a cumulative ejection amount of the shaping material ejected from the nozzle, and a use time of the nozzle in association with the nozzle, the control unit controls a cleaning frequency of cleaning operations or an interval between two cleaning operations based on the material information, the cumulative ejection amount, or the use time of the nozzle, the use time of the nozzle being a total time during which the shaping material is ejected from the nozzle, wherein each of the brush and the blade extending along a first direction so that the brush and the blade are parallel to each other and face each other along a second direction perpendicular to the first direction, and the control unit is configured to: cause the nozzle to reciprocally move several times along a zigzag path in the cleaning operation when viewed along a third direction perpendicular to the first and second directions such that the nozzle passes from a side of the blade toward a side of the brush to contact a first point of at least one of the brush and blade, and the nozzle passes from the side of the brush toward the side of the blade to contact a second point of at least one of the brush and the blade, the first point and the second point are different positions in the first direction.

2. The three-dimensional shaping device according to claim 1, wherein
the control unit determines a mode of the cleaning operation or an execution timing of the cleaning processing based on at least one of the material information, the cumulative ejection amount, and the use time of the nozzle.

3. The three-dimensional shaping device according to claim 2, wherein
the control unit determines the execution timing of the cleaning processing for a plurality of times, and
an interval from an execution timing of an n-th cleaning processing to an execution timing of an (n+1)-th cleaning processing is shorter than an interval from an execution timing of an (n−1)-th cleaning processing to the execution timing of the n-th cleaning processing, n being an integer of 2 or more.

4. The three-dimensional shaping device according to claim 2, wherein
the control unit determines the execution timing of the cleaning processing for a plurality of times, and
a cleaning strength in an (m+1)-th cleaning processing is stronger than a cleaning strength in an m-th cleaning processing, m being an integer of 1 or more.

5. The three-dimensional shaping device according claim 2, wherein
when a period from an execution timing of a p-th cleaning processing to an execution timing of a (p+1)-th cleaning processing is shorter than a period determined based on the cumulative ejection amount or the use time of the nozzle, p being an integer of 1 or more, the control unit does not execute the (p+1)-th cleaning processing or changes a start timing of the (p+1)-th cleaning processing.

6. The three-dimensional shaping device according claim 2, wherein
when the cleaning processing is executed according to a determined execution timing of an r-th cleaning processing, r being an integer of 1 or more, the control unit inspects a state of the nozzle before the execution of the cleaning processing, and changes a mode of cleaning operations of the r-th cleaning processing and a subsequent cleaning processing or the execution timing of the cleaning processing based on an inspection result.

7. The three-dimensional shaping device according claim 2, wherein
when the plasticizing material is changed, the control unit changes the execution timing of the cleaning processing or the mode of the cleaning operation.

8. The three-dimensional shaping device according claim 1, wherein
when the cleaning processing is executed, the control unit records a cleaning processing execution history in association with the cumulative ejection amount or the use time of the nozzle.

9. The three-dimensional shaping device according to claim 1, wherein the nozzle includes a shield for suppressing transfer of heat of the plasticizing mechanism to the shaping material stacked at the stage, and a nozzle memory, which is positioned between a nozzle opening and the shield arranged along a vertical direction, the control unit records at least one of the material information, the cumulative ejection amount of the shaping material, and the use time of the nozzle in association with the nozzle in the nozzle memory.

10. The three-dimensional shaping device according to claim 9, wherein plasticizing mechanism includes a heating block that has a heater and is provided with a through hole, the nozzle is detachably attached to the through hole of the heating block, the nozzle memory being electrically coupled to the control unit by attaching the nozzle to the heating block.

11. The three-dimensional shaping device according to claim 1, wherein a modulus of elasticity of the blade is higher than a modulus of elasticity of the brush.

12. The three-dimensional shaping device according to claim 1, wherein, in the cleaning operation, the control unit is configured to cause the nozzle to traverse and contact the brush a first number of times and cause the nozzle to traverse and contact the blade a second number of times, and the first number of times is larger than the second number of times.

13. The three-dimensional shaping device according to claim 1, wherein in the cleaning operation, the control unit is configured to cause the nozzle to reciprocate such that the nozzle contacts with the brush or the blade at different positions in the first direction each time the nozzle passes through the brush or the blade.

* * * * *